United States Patent [19]

Tanaka et al.

[11] Patent Number: 5,712,022

[45] Date of Patent: *Jan. 27, 1998

[54] PRINTED THERMOPLASTIC RESIN PRODUCTS AND METHOD FOR PRINTING SUCH PRODUCTS

[75] Inventors: Ban Tanaka, Toyota; Hiroki Nii; Kosaku Yamada, both of Fukuyama; Hideo Kushida, Yachiyo; Takashi Miya, Kamagaya; Shuichi Koshio, Sakura; Tadashi Hayakawa, Chiba, all of Japan

[73] Assignees: Yoshino Kogyosho Co., Ltd., Tokyo; Hayakawa Rubber Co., Ltd., Hiroshima, both of Japan

[*] Notice: The term of this patent shall not extend beyond the expiration date of Pat. No. 5,587,405.

[21] Appl. No.: 488,408

[22] Filed: Jun. 7, 1995

Related U.S. Application Data

[63] Continuation-in-part of Ser. No. 111,559, Aug. 25, 1993, abandoned.

[30] Foreign Application Priority Data

Sep. 14, 1992 [JP] Japan .................. 4-269142

[51] Int. Cl.[6] .................................. B32B 27/00
[52] U.S. Cl. .................. 428/195; 428/421; 428/423.1; 428/447; 428/483; 428/521; 428/522; 428/35.7; 427/508; 427/511; 427/514; 427/515
[58] Field of Search ................... 428/195, 421, 428/423.1, 447, 483, 521, 522, 35.7; 427/508, 511, 514, 515; 522/92, 93, 96, 98, 104, 107, 172, 179, 182; 523/160, 500; 525/12, 20, 23, 28, 29, 31, 35, 36, 39, 48, 445; 430/284.1, 285.1, 286.1, 287.1; 106/20 B, 31.13

[56] References Cited

U.S. PATENT DOCUMENTS

| | | | |
|---|---|---|---|
| 4,333,998 | 6/1982 | Leszyk | 430/12 |
| 4,561,950 | 12/1985 | Leo | 522/91 |
| 4,650,845 | 3/1987 | Hegel | 526/261 |
| 4,929,469 | 5/1990 | Kimura et al. | 427/54.1 |
| 4,985,473 | 1/1991 | Williams et al. | 522/89 |
| 5,091,440 | 2/1992 | Griswold | 522/99 |
| 5,200,438 | 4/1993 | Fujii et al. | 522/96 |
| 5,236,968 | 8/1993 | Hirschmann | 522/78 |
| 5,279,917 | 1/1994 | Adachi et al. | 430/157 |
| 5,354,367 | 10/1994 | Pennaz | 106/20 R |

FOREIGN PATENT DOCUMENTS

| | | |
|---|---|---|
| 0 243 605 | 11/1987 | European Pat. Off. . |
| 469973 | 2/1992 | European Pat. Off. . |
| 499447 | 8/1992 | European Pat. Off. . |
| 1542334 | 10/1968 | France . |
| 3 303 784 | 8/1983 | Germany . |
| 50-095002 | 7/1975 | Japan . |
| 56-120708 | 9/1981 | Japan . |
| 56-122028 | 9/1981 | Japan . |
| 56-122029 | 9/1981 | Japan . |
| 56-122030 | 9/1981 | Japan . |
| 60-121444 | 6/1985 | Japan . |
| 60-191244 | 9/1985 | Japan . |
| 61-292632 | 12/1986 | Japan . |
| 62-075633 | 4/1987 | Japan . |
| 62-229140 | 10/1987 | Japan . |
| 62-294487 | 12/1987 | Japan . |
| 63-017908 | 1/1988 | Japan . |
| 63-126222 | 5/1988 | Japan . |
| 63-126223 | 5/1988 | Japan . |
| 63-167349 | 7/1988 | Japan . |
| 63-177126 | 7/1988 | Japan . |
| 63-205650 | 8/1988 | Japan . |
| 63-259657 | 10/1988 | Japan . |
| 63-261255 | 10/1988 | Japan . |
| 63-278052 | 11/1988 | Japan . |
| 63-287949 | 11/1988 | Japan . |
| 1-032256 | 2/1989 | Japan . |
| 1-035435 | 2/1989 | Japan . |
| 1-070745 | 3/1989 | Japan . |
| 1-102456 | 4/1989 | Japan . |
| 1-106042 | 4/1989 | Japan . |
| 1-253729 | 10/1989 | Japan . |
| 1-277234 | 11/1989 | Japan . |
| 1-309050 | 12/1989 | Japan . |

(List continued on next page.)

OTHER PUBLICATIONS

Chemical Abstracts 115(16):170716y.

*Primary Examiner*—Marie Yamnitzky
*Attorney, Agent, or Firm*—Oliff & Berridge, P.L.C.

[57] ABSTRACT

An easily regeneratable printed thermoplastic resin product is provided by printing it with a specific radiation-curable ink composition and curing the printed ink with radiation to form a cured ink film thereon. The ink composition comprises a vehicle mixture containing: (A) at least one linear polyester oligomer and/or polymer substantially free of an acid group and a polymerizable double bond on the linear polyester chain wherein 1 to 10 double bonds are pendent from the linear polyester chain, and/or mixture thereof, (B) at least one single double bond-containing carboxylic acid and/or ester and/or amide wherein the acid has at least one acid group, and/or mixture thereof, (C) a double bond-containing polycarboxylic ester wherein 2 to 10 acid groups are present and at least 2 double bonds are pendent from the carboxylic ester having 2 to 10 acid groups, (D) at least one double bond-containing fluorinated carboxylic ester, and/or block copolymer comprising a fluorinated alkyl group-containing polymer segment and a (meth)acrylic polymer segment, and/or block copolymer comprising a siloxane group-containing polymer segment and a (meth)acrylic polymer segment, and/or mixture thereof, (E) a double bond-containing carboxylic ester, having at least 2 double bonds and free of an acid group, provided that it is excluded from the above-mentioned ingredient (A), and (F) at least one single double bond-containing carboxylic ester and/or amide and/or imide free of an acid group, and/or mixture thereof, wherein the acid value of the vehicle mixture is from 5 to 100. The ink is useful in displaying and decorating trade names, designs, explanatory notes, bar code, etc. on specific thermoplastic products and the cured ink film is easily detachable with an aqueous alkali solution.

36 Claims, No Drawings

FOREIGN PATENT DOCUMENTS

| | | |
|---|---|---|
| 2-099504 | 4/1990 | Japan . |
| 2-125259 | 5/1990 | Japan . |
| 2-166452 | 6/1990 | Japan . |
| 2-217859 | 8/1990 | Japan . |
| 2-235909 | 9/1990 | Japan . |
| 2-247654 | 10/1990 | Japan . |
| 2-248952 | 10/1990 | Japan . |
| 2-272010 | 11/1990 | Japan . |
| 2-296801 | 12/1990 | Japan . |
| 3-039746 | 2/1991 | Japan . |
| 3-054817 | 3/1991 | Japan . |
| 3-077947 | 4/1991 | Japan . |
| 3-077948 | 4/1991 | Japan . |
| 3-077949 | 4/1991 | Japan . |
| 3-148657 | 6/1991 | Japan . |
| 3-153768 | 7/1991 | Japan . |
| 3-163550 | 7/1991 | Japan . |
| 3-208056 | 9/1991 | Japan . |
| 3-225343 | 10/1991 | Japan . |
| 3-250006 | 11/1991 | Japan . |
| 3-260652 | 11/1991 | Japan . |
| 3-265860 | 11/1991 | Japan . |
| 3-274557 | 12/1991 | Japan . |
| 3-290428 | 12/1991 | Japan . |
| 3-296755 | 12/1991 | Japan . |
| 4-039664 | 2/1992 | Japan . |
| 4-110946 | 4/1992 | Japan . |
| 4-142544 | 5/1992 | Japan . |
| 4-170480 | 6/1992 | Japan . |
| 4-170481 | 6/1992 | Japan . |
| 4-206625 | 7/1992 | Japan . |
| 4-217255 | 8/1992 | Japan . |
| 4-217256 | 8/1992 | Japan . |
| 4-294352 | 10/1992 | Japan . |
| 4-298751 | 10/1992 | Japan . |
| 5-011446 | 1/1993 | Japan . |
| 5-027435 | 2/1993 | Japan . |
| 5-043654 | 2/1993 | Japan . |
| 5-045867 | 2/1993 | Japan . |
| 5-107760 | 4/1993 | Japan . |
| 1433919 | 4/1976 | United Kingdom . |

PRINTED THERMOPLASTIC RESIN PRODUCTS AND METHOD FOR PRINTING SUCH PRODUCTS

This is a Continuation-in-Part of application Ser. No. 08/111,559, filed Aug. 25, 1993 now abandoned.

FIELD OF THE INVENTION

The present invention relates to a method for printing a plastic product with a specific radiation-curable type printing ink capable of directly printing trade names, designs, explanatory notes, bar code, etc. on the plastic resin product, if desired, a ronghened surface of the plastic resin product, for displaying and decorating, quickly curing the printed ink on a high-speed drying line to form a dried film capable of maintaining the quality required at the distribution stage, and after collection of the used product, dissolving or removing the film in a membranous form with an aqueous alkaline solution to recover the base materials in a clean condition.

More specifically, the present invention relates to a method for printing specific thermoplastic products such as polyethylene terephthalate resin products, with a specific radiation-curable printing ink capable of dissolving or removing as a cured ink film in an aqueous alkaline solution from the printed products.

The present invention further relates to a printed thermoplastic product which is painted with a radiation-curable type printing ink capable of directly marking trade names, designs, explanatory notes, bar code, etc. thereon for displaying and decorating, quickly curing on a high-speed drying line to form a dried film maintainable for the quality required at the distribution stage, and after collection of the used product, dissolving or removingas a cured ink film with an aqueous alkaline solution to recover the base materials in a clean condition.

The present invention also relates to a method for eliminating or removing the radiation-curable type printing ink from the printed thermoplastic products such as polyethylene terephthalate resins, wherein the radiation-curable type printing ink is capable of directly printing trade names, designs, explanatory notes, bar code, etc. on the thermoplastic resin product for displaying and decorating, quickly curing the printed ink on a high-speed drying line to form a dried film capable of maintaining the quality required at the distribution stage, and after collection of the used product, dissolving or removing the film in a membranous form with an aqueous alkaline solution to recover the base materials in a clean condition.

BACKGROUND OF THE INVENTION

The thermoplastic resin product, particularly polyethylene terephthalate product, has been utilized especially as a container for cosmetics, liquid seasonings, drinks such as beer or cola and medicine since it is free from toxicity, superior in gas-barrier ability and water-impermeability to other synthetic resins and has an exterior appearance that is similar to that of glass. In many cases, an explanatory note and name of commodity have been printed on the side wall of the thermoplastic resin container with the printing ink made from ultraviolet-curable type resin as a vehicle.

In recent years, problems with garbage incineration and environmental pollution, caused by waste plastic products, have drawn to keen public attention and serious concerns have been growing in regard to collection, restoration and re-formation of the plastic product waste. However, the used plastic product so collected presents difficulties in various aspects for regeneration. Therefore, the majority of plastic product wastes have simply been melted for regeneration and used in a limited range of recycle purposes. The main reason for this is that the waste product so collected has printings for decoration and other purposes and the ink printed on it affects adversely the quality of the plastic product which is regenerated from the printed plastic product so collected as a starting material.

SUMMARY OF THE INVENTION

The present invention uses a specific ink for printing a plastic product in order to ensure easy regeneration of the collected waste plastic product and to solve the problems relating to garbage incineration or environmental pollution, caused by the waste plastic product. The present invention provides a practical method for printing the plastic product with the specific ink and removing the printed ink from the collected waste plastic product.

The present invention relates to thermoplastic resin products printed with the specific ink which ensures versatile utilization of the plastic product to be collected after its use.

The present invention relates to thermoplastic resin products which are (i) printed with a printing ink having, as a base, a radiation-curable type ink composition comprising a vehicle mixture comprising:

(A) at least one ingredient selected from the group consisting of a linear polyester oligomer substantially free of an acid group and free of a polymerizable double bond on the linear polyester chain wherein 1 to 10 double bonds are pendent from the linear polyester chain; a linear polyester polymer substantially free of an acid group and free of a polymerizable double bond on the linear polyester chain wherein 1 to 10 double bonds are pendent from the linear polyester chain; and mixtures thereof, (B) at least one ingredient selected from the group consisting of a one double bond-containing carboxylic acid wherein the acid has at least one acid group, a carboxylic ester of the said acid, a carboxylic amide of the said acid, and mixtures thereof, (C) a double bond-containing polycarboxylic ester wherein 2 to 10 acid groups are present and at least 2 double bonds are pendent from the carboxylic ester having 2 to 10 acid groups, and (D) at least one ingredient selected from the group consisting of a double bond-containing fluorinated carboxylic ester, a block copolymer comprising a fluorinated alkyl group-containing polymer segment and a (meth)acrylic polymer segment, a block copolymer comprising a siloxane group-containing polymer segment and a (meth)acrylic polymer segment, and mixtures thereof, wherein the acid value of the vehicle mixture is from 5 to 100, and (ii) then treated with radiation on the printed surface thereof to harden the radiation-curable ingredients in the printing ink.

In another aspect, the present invention relates to thermoplastic resin products which are (i) printed with a printing ink having, as a base, a radiation-curable type ink composition comprising the vehicle mixture comprising from the said ingredients (A) to (D) in admixture with:

(E) a double bond-containing carboxylic ester, having at least 2 double bonds and free of an acid group, provided that it is excluded from the above-mentioned ingredient (A) and (F) at least one ingredient selected from the group consisting of a one double bond-containing carboxylic ester free of an acid group; a one double bond-containing carboxylic amide free of an acid group; a one double bond-containing carboxylic imide free of an acid group; and mixtures thereof.

In a preferred embodiment according to the present invention, the radiation-curable type ink composition comprises the said vehicle mixture in combination with:

(i) 0 to 20 parts by weight of a photopolymerization initiator, (ii) 0 to 20 parts by weight of a photosensitizer and (ii) 0 to 100 parts by weight of an organic and/or inorganic pigment per 100 parts by weight of the vehicle mixture.

According to the present invention, there may be no chance that the decorative prints such as designs or marks on products drop off or get tainted causing damage to a trading image at the distribution stage. Furthermore, by means of treating the waste products with an aqueous alkaline solution to remove the prints in a filmy form after their collection, a clean state of the base materials can be restored without any prints. The detached film contained in the alkaline waste water is also removed by filtration, dissolved as lapse of time, or caught by air separation such as cyclone in a state completely segregated from the base materials, thus it will scarcely flow out into the surroundings and handling will be much easier.

In the printing method according to the present invention, printing is possible without any surface treatment of the thermoplastic resin product prior to printing but the surface of the thermoplastic resin product may be roughened or treated with flame, corona discharge or anchor coating. The radiation-curable ink according to the present invention is adhered to the plastic product in extremely close contact due to the adhesiveness and stress-peeling preventive mechanism attributable to the low contractivity based on the structure of a double bond-containing oligomer and/or a polymer thereof. The close adhesion of the radiation-curable ink composition to the plastic body construction even without any pretreatment provides a remarkable advantage in curtailing production steps in an overall printing process.

DETAILED DESCRIPTION OF THE INVENTION

The present invention relates to thermoplastic resin products which are (i) printed with a novel printing ink and (ii) then treated with radiation on the printed surface thereof to harden the radiation-curable ingredients in the printing ink, wherein the said printing ink has, as a base, a radiation-curable type ink composition comprising the vehicle mixture containing at least the above-mentioned components (A) to (D) wherein the acid value of the vehicle mixture is from 5 to 100. In another aspect, the present invention relates to thermoplastic resin products which are (i) printed with a novel printing ink and (ii) then treated with radiation on the printed surface thereof to harden the radiation-curable ingredients in the printing ink, wherein the said printing ink has, as a base, a radiation-curable type ink composition comprising the vehicle mixture containing at least the above-mentioned components (A) to (F) wherein the acid value of the vehicle mixture is from 5 to 100. In an embodiment, the radiation-curable type ink composition comprising the vehicle mixture may be used in combination with:

(i) 0 to 20 parts by weight of a photopolymerization initiator, (ii) 0 to 20 parts by weight of a photosensitizer and (ii) 0 to 100 parts by weight of an organic and/or inorganic pigment per 100 parts by weight of the vehicle mixture.

In another embodiment, the present invention relates to thermoplastic resin products which are printed with a printing ink and then treated with radiation on the printed surface thereof to harden the radiation-curable ingredients in the printing ink, characterized by that the said printing ink has, as a base, a radiation-curable type ink composition comprising, as major vehicle ingredients, (1) the above-mentioned (A) to (C) and (E) to (F) components and, as the (D) component, a fluorinated double bond-containing carboxylic ester wherein the fluorine component is oriented on the surface of copolymer or polymer to give water-repellency, or (2) the above-mentioned (A) to (C) and (E) to (F) components and, as the (D) component, a block copolymer which comprises a surface-oriented and water-repellent fluorinated alkyl group-containing polymer segment and a (meth)acrylic polymer segment, or (3) the above-mentioned (A) to (C) and (E) to (F) components and, as the (D) component, a block copolymer which comprises a surface-oriented and water-repellent siloxane group-containing polymer segment and a (meth)acrylic polymer segment, wherein the acid value of the vehicle mixture is from 5 to 100 and the ink composition preferably comprises 0 to 20 parts by weight of a photopolymerization initiator, 0 to 20 parts by weight of a photosensitizer, and 0 to 100 parts by weight of an organic and/or inorganic pigment to 100 parts by weight of the above-mentioned vehicle.

In another embodiment, the present invention also relates to thermoplastic resin products which are printed with a printing ink and then treated with radiation on the printed surface thereof to harden the radiation-curable ingredients in the printing ink, characterized by that the said printing ink has, as a base, a radiation-curable type ink composition comprising, as a major vehicle ingredient, the mixture of the above-mentioned (A) to (C) and (E) to (F) components and, as the (D) component, two or three members selected from the group consisting of a fluorinated double bond-containing carboxylic ester wherein the fluorine component is oriented on the surface of a coplymer or polymer to give water-repellency, a block copolymer which comprises a surface-oriented and water-repellent fluorinated alkyl group-containing polymer segment and a (meth)acrylic polymer segment, and a block copolymer which comprises a surface-oriented and water-repellent siloxane group-containing polymer segment and a (meth)acrylic polymer segment, wherein the acid value of the vehicle mixture is from 5 to 100 and the ink composition comprises additionally 0 to 20 parts by weight of a photopolymerization initiator, 0 to 20 parts by weight of a photosensitizer, and 0 to 100 parts by weight of an organic and/or inorganic pigment to 100 parts by weight of the above-mentioned vehicle.

For the thermoplastic resin product, various resin products such as polyester resin products and polyolefin resin products can be utilized but, among all, the polyethylene terephthalate product is particularly preferable. The polyethylene terephthalate which can be used in the present invention are polyesters having ethylene terephthalate repeating units, which comprises basically terephthalic acid as an acid component and ethylene glycol as a glycol component, but may contain at least one acid component and at least one glycol component for copolymers. The acid component my include isophthalic acid, diphenyl ether-4, 4'-dicarboxylic acid, naphthalene-1,2- or -2,6-dicarboxylic acid, adipic acid, sebacic acid, decane-1,4-dicarboxylic acid, hexahydroterephthalic acid, and the like. The glycol component may include propylene glycol, 1,4-butanediol, neopentyl glycol, diethylene glycol, polyethylene glycol, polypropylene glycol, polytetramethylene glycol, cyclohexanedimethanol, 2,2-bis(4-hydroxyphenyl)propane, 2,2-bis(4-hydroxyethoxyphenyl)propane, p-hydroxybenzoic acid, and the like. These acid and glycol components may be each mixed within the range of less than 50% for each content in the copolymer content as a whole.

Examples of such thermoplastic resin products are containers for cosmetics and toiletries, containers for liquid seasonings, containers for drinks such as beer or cola, containers for medicine, containers for liquid detergents, and the like.

The polyethylene terephthalate used in the present invention may contain additives such as a coloring agent, an ultraviolet-absorbing agent and an anti-static agent in an appropriate proportion as the case may be.

The present invention also relates to a method for printing a plastic product with a radiation-curable type printing ink, characterized by the said printing ink having, as a base, a radiation-curable type ink composition comprising the vehicle mixture of the above-mentioned (A) to (F), or a vehicle mixture containing at least the above-mentioned components (A) to (D), wherein the acid value of the vehicle mixture is from 5 to 100, together with 0 to 20 parts by weight of a photopolymerization initiator, 0 to 20 parts by weight of a photosensitizer and 0 to 100 parts by weight of an organic and/or inorganic pigment per 100 parts by weight of the vehicle mixture.

The method for printing the plastic product according to the present invention is to first carry out printing with the printing ink having the radiation-curable type composition as a base, which comprises the above-mentioned (A) to (F), and then harden the radiation-curable ingredients in the printing ink by applying radiation to the printed surface.

The polyethylene terephthalate product in accordance with the present invention includes containers made of, as starting materials, saturated polyesters such as polyethylene terephthalate by molding.

The containers to be used in the method for printing on the surface of a container according to the present invention include polyester containers obtained by processes such as hollow molding, blow molding with double axle extention or injection molding and the like.

Further, the composition of radiation-curable type ink removable with alkali according to the present invention includes a fluorinated carboxylic ester containing double bonds and/or fluorinated block copolymer and/or silicon block copolymer, and, upon printing, the fluorine and/or silicon rich parts are oriented on the surface, thereby affording chemical resistance, water-repellency, soil resistance and abrasion resistance and enhancing the stability during distribution of printed products as well as during its actual use.

The present invention also relates to a method for eliminating or removing a radiation-curable type printing ink from printed thermoplastic products, which comprises printing the thermoplastic product with the printing ink which has, as a base, a radiation-curable type ink composition comprising the vehicle mixture of the above-mentioned (A) to (F) wherein the acid value of the vehicle mixture is from 5 to 100, together with 0 to 20 parts by weight of a photopolymerization initiator, 0 to 20 parts by weight of a photosensitizer and 0 to 100 parts by weight of an organic and/or inorganic pigment per 100 parts by weight of the vehicle mixture, followed by radiation on the printed surface thereof to harden the radiation-curable ingredients in the printing ink, and dissolving or removing the cured film in a membranous form with an aqueous alkaline solution.

While the conditions for detaching the ink composition by alkali vary depending on the weight ratio of (B), (C) and (0), it is preferable to have an alkaline concentration of 5% or more, a temperature at 70° C. or more and a duration of 5 minutes or more. However, it may be practical to use an alkaline concentration of 1% and a temperature to 50° C. by immersion for an extended time in an alkaline solution or immersion while brushing the printed surface, by controlling the weight ratio of (B), (C) and (D), or by reflecting additional conditions brought by the printing and curing processes and the like.

When the alkali removing treatment is adopted on a commercial scale, it may be performed by the selective application of those conditions.

Moreover, the alkali-Movable radiation-curable ink composition includes the mixture of an alkali metal and a double bond-containing (poly)carboxylic ester, having an acid group which facilitates formation of water soluble salts or salts capable of water-swelling, and the cured ink film is removed in filmy form without difficulty from the used printed product by means of treatment with an aqueous alkaline solution, thereby, allowing regenerative plastic resins and products to be recovered in a clean condition.

The filmy detachment of cured ink film is caused by the permeation of an aqueous alkaline solution through the interface between the body construction material and the ink film while preventing infiltration of an aqueous alkaline solution from the surface due to the water-repellency created by the surface orientation of the double bond-containing fluorinated carboxylic ester and/or fluorinated block copolymer and/or silicon block copolymer. As such, the ink film so removed can be collected in a simple process such as filtration. There is no problem with water contamination since none of them are discharged into waste water.

Furthermore, the scope of its application is further enlarged in view of the possibility that the amount of double bond containing fluorinated carboxylic ester and/or fluorinated block copolymer and/or silicon block copolymer is reduced, and/or the amount of double bond-containing carboxylic ester which is water soluble or facilitates generation of water swelling alkali metal salt is increased/reduced to dissolve the ink as a whole in an aqueous alkaline solution and to remove the ink from the surface of the plastic.

The ingredient (A) for the present vehicle mixture in the radiation-curable ink composition according to the present invention is at least one ingredient selected from the group consisting of a linear polyester oligomer substantially free from an acid group and a polymerizable double bond on the linear polyester chain, wherein 1 to 10 double bonds are pendent from the linear polyester chain; a linear polyester polymer substantially free of an acid group and a polymerizable double bond on the linear polyester chain, wherein 1 to 10 double bonds are pendent from the linear polyester chain; and mixtures thereof.

The linear polyester oligomer and/or polymer having 1 to 10 pendent double bonds in a molecule and having no polymerizable double bond in the main chain represent(s) an oligomer and/or polymer having radiation-polymerizable 1 to 10 double bonds in a molecule. The said oligomer and/or polymer are (is) not only indicating the characteristics of being polymerized with radiation by itself but also capable of polymerizing in combination with other radiation-polymerizable double bond containing compounds.

The pendent double bonds in the said oligomer and/or polymer include those in a vinyl group, allyl group, (meth) acryloyl group, crotonyl group etc. but (meth)acryloyl is preferable because of its increased polymerizability when radiation is applied.

The double bond-containing groups in the said oligomer and/or polymer includes those in vinyl groups, allyl groups, (meth)acryloyl groups, crotonyl groups and the like but (meth)acryloyl groups are preferable because of their increased polymerizability when radiation is applied.

For the polyester oligomer and/or polymer having a (meth)acryloyl group, polyurethane-(meth)acrylate is used in particular as it has an adhesive nature in contact with the base or a flexible chemical structure capable of following the expansion/contraction of the base. It is more preferable to use polyurethane (meth)acrylate made from high molecular polyol wherein the polyester polyol is extended with diisocyanates.

The copolymerized polyester polyols are synthesized mainly with dicarboxylic acid components and glycol components. The polyester has no polymerizable double bond in its skeleton and is called a "saturated polyester".

The dicarboxylic acid component may include as a main constituent an aromatic dicarboxylic acid such as terephthalic acid, isophthalic acid and orthophthalic acid and the like and is used more than 60 mol% in total diacid compounds, and, for the purpose of affording flexibility, an aliphatic dicarboxylic acid such as succinic acid, adipic acid, sebacic acid, dodecane dicarboxylic acid etc. and an alicyclic dicarboxylic acid such as hexahydrophthalic acid and tetrahydrophthalic acid is also used less than 40 mol % in total discid compounds.

The glycol component may include ethylene glycol, propylene glycol, 1,3-propanediol, 1,4-butanediol, 1,6-hexanediol, neopentyl glycol, diethylene glycol, dipropylene glycol, 1,4-cyclohexanedimethanol, spiro glycol, 1,4-phenylene glycol, an ethylene oxide or polyethylene oxide derivative of bisphenol A, polyethylene glycol, polypropylene glycol, and the like. Depending on necessity, a small amount of triols or tetraols such as trimethylol propane, glycerine, pentaerythritol and the like my be admixed.

In order to synthesize copolymerized polyester polyols from such dicarboxylic acid components and glycol components, an excess amount of the glycol component is used per dicarboxylic acid starting component. It is preferable to perform synthesis so that the terminal carboxylic group may be mintained at less than 50 eq/$10^6$ g in the resultant copolymerized polyester. In cases where it exceeds 50 eq/$10^6$ g, the target polyurethane (meth)acrylate product will not be obtained due to excessive increase of the inactive ends during reaction with diisocyanate compounds at the time of extending polyester polyols to urethane polymers.

In order to obtain the urethane acrylate from the copolymerized polyester polyol so synthesized, the said copolymerized polyester, a polyisocyanate compound and a compound having a (meth)acryloyl group as well as an active hydrogen group my be reacted.

The polyisocyanate compound may include 2,4-trilene diisocyanate, diphenylmethane diisocyanate, 1,3-diisocyanate methylcyclohexane, 1,4-diisocyanate methylcyclohexane, 4,4'-diisocyanate dicyclohexane, 4,4'-diisocyanate dicyclohexylmethane, isophorone diisocyanate and a variety of other commercially available diisocyanates. In addition, when polyfunctional acrylates are required, polyisocyanate in a class more than tri-isocyanate may be applied alone or in combination with the said diisocyanate.

The chemical compound having a (meth)acryloyl group and an active hydrogen group refers to a compound having at least one double bond and at least one hydroxyl group in one molecule. The double bond which can be used in the present invention may be vinylic, allylic, methacrylic, acrylic, crotonic, etc. The (meth)acryloyl groups are preferred in view of their high sensitivity against radiation.

The chemical compounds having a (meth)acryloyl group and an active hydrogen group may include dihydric alcohol mono(meth)acrylates such as ethylene glycol mono(meth)acrylate, propylene glycol mono(meth)acrylate, butanediol mono(meth )acrylate, diethylene glycol mono(meth )acrylate, dipropylene glycol mono(meth)acrylate and the like; trihydric alcohol mono- or di-(meth)acrylates such as trimethylol ethane mono(meth)acrylate, trimethylol ethane di(meth)acrylate, trimethylol propane mono(meth )acrylate, trimethylol propane di(meth )acrylate, glycerine mono (meth)acrylate, glycerine di(meth)acrylate and the like; polyhydric alcohol (meth)acrylates having a hydroxy group, including the (meth)acrylate of an alcohol containing 4 or more hydroxy groups, such as pentaerythritol mono(meth )acrylate, pentaerythritol di(meth )acrylate, pentaerythritol tri(meth )acrylate and dipentaerythritol tetra(meth)acrylate; a chemical compound having a hydroxy group, derived from (meth)acrylation of caprolactone derivatives of any of the aforementioned alcohols; epoxy(meth)acrylates prepared by a ring-opening addition of (meth)acrylic acids with epoxy compounds, including monoglycidyl ethers; dihydric alcohol diglycidyl ethers such as ethylene glycol diglycidyl ether, polyethylene glycol diglycidyl ether, propylene glycol diglycidyl ether and neopentyl glycol diglycidyl ether; polyhydric alcohol glycidyl ethers such as trimethylol propane triglycidyl ether and the like; the glycidyl ether of a chemical compound having a phenolic hydroxy group, such as bisphenol A glycidyl ether and the like.

These compounds may be used singularly or in combination of 2 or more kinds. The double bond-pendent polyester oligomer and/or polymer which is obtained by reaction of the aforementioned starting compounds may be acceptable if it contains at least one double bond, and those having 1 to 10 double bonds are utilized for such application. For the purpose of avoiding any tack on cured film surface and maintaining adhesiveness and flexibility in contact with the base, it is preferable to keep at least 3 to 7 double bonds in a single molecule.

The ingredient (B) for the present vehicle mixture in the radiation-curable ink composition according to the present invention is at least one ingredient selected from the group consisting of a one double bond-containing carboxylic acid wherein the carboxylic acid has at least one acid group, a carboxylic ester of the said acid, a carboxylic amide of the said acid, and mixtures thereof.

The group consisting of a one double bond-containing carboxylic acid wherein the carboxylic acid has at least one acid group, a carboxylic ester of the said carboxylic acid and a carboxylic amide of the said carboxylic acid, is regarded, in general, as an "acid monomer". A homopolymer of the acid monomer and a copolymer with higher contents of the acid monomer form water soluble alkali metal salts.

The double bond in the "acid monomer" may be vinylic, allylic, (meth)acrylic, crotonic, etc. The (meth)acryloyl groups are preferable in this instance in view of their high radiation-curing ability. The acid group includes a carboxyl group, sulfonyl group, phosphoryl group and the like but an introduction of carboxyl groups into the molecule my usually serve the purpose. Each molecule requires at least 1 to 2 carboxyl groups.

While the simplest carboxyl group-containing acid monomer is (meth)acrylic acid, it is not desirable to be used as the starting materials for ink products owing to its strong odor and from the safety point of view. Therefore, the acid monomer is synthesized by reacting the compound having a double bond and a hydroxyl group in the same molecule, with a cyclic acid anhydride corresponding to its hydroxyl equivalent. The acid monomers are an alkylene oxide derivative of acid anhydride-carboxylated (meth)acrylic acids, a caprolactone derivative of acid anhydride-carboxylated (meth)acrylic acids, a monoglycidyl ether derivative of acid anhydride-carboxylated (meth)acrylic acids, an acid anhydride-carboxylated methylol (meth) acrylic amide, etc. The acid anhydride includes succinic anhydride, maleic anhydride, dodecylsuccinic anhydride, phthalic anhydride, tetrahydrophthalic anhydride, etc. Maleic anhydride is useful because of its less polymerizability per se and even after ring-opening esterification and because of its less polymerization with (meth)acrylates.

The aforementioned acid monomer can be synthesized from a compound having one double bond and at least one hydroxyl group in one molecule by addition of a cyclic acid anhydride in an equimolar amount in view of the hydroxy group of the compound followed by heating for a determined period to introduce the carboxyl group. The anhydride to be used for the introduction of the carboxyl group includes saturated aliphatic dicarboxylic anhydrides such as succinic anhydride and the like, unsaturated aliphatic dicarboxylic anhydrides such as maleic anhydride, itaconic anhydride and the like, alicyclic dicarboxylic anhydrides such as tetrahydrophthalic anhydride, hexahydrophthalic anhydride and the like, aromatic dicarboxylic anhydrides such as phthalic anhydride, naphthenic anhydride and the like, tricarboxylic anhydrides such as trimellitic anhydride and the like.

Furthermore, acrylic acid dimers and acrylic acid trimers produced as by-products in the synthesis of an acrylic acid monomer can be used as acid monomers as they are.

The acid monomers wherein an acid group (other than a carboxyl group) is capable of forming a water-soluble homopolymer with an alkali metal salt are phosphoric acid mono- or di-esters such as mono(meth)acryloxyethylphosphate, (meth)acryloxyethylphosphorylphenyl, di(meth)acryloxyethylphosphate and the like, sulfonic esters such as (meth)acryloxyethylsulfonate, di(meth)acryloxyethylsuccinylsulfonate and the like.

The above-mentioned acid monomer my be used singularly or in a mixture of 2 or more, depending on desired final physical properties of the cured film and its amount to be used my also be determined with the similar consideration.

The ingredient (C) for the present vehicle mixture in the radiation-curable ink composition according to the present invention is a double bond-containing polycarboxylic ester, wherein 2 to 10 acid groups are present and at least 2 double bonds are pendent from the carboxylic ester having 2 to 10 acid groups.

The double bond-containing polycarboxylic ester having 2 to 10 acid groups and having at least 2 pendent double bonds in a molecule is regarded, in general, as an "acid oligomer". A homopolymer of the said acid oligomer and/or a copolymer with higher contents of the said acid oligomer have(has) a high cross-linking density and a capability of forming a water-swelling alkali metal salt. Its alkali metal salt also has the characteristics of swelling with water absorption.

As well as in the case of the above-mentioned acid monomer, a preferred double bond-containing group in this acid oligomer is a methacryloyl or acryloyl group in view of its higher radiation-curing ability. Also, the same concept is applicable to the oligomer's acid group which is capable of forming an alkali metal salt. Examples of such acid groups are carboxyl groups, sulfonyl groups and phosphoryl groups and the like but carboxyl is rather popular. While the number of the acid group actually used in the application for the present invention ranges from 1 to 10, the number has to be determined by the molecular weight of the acid oligomer but it is practical, in view of availability, to adopt 2 to 6 for the acid oligomer to be economically synthesized. The acid oligomer is so-called polyfunctional wherein the number of double bonds (number of functional groups) in a molecule is more than 2. The above-mentioned acid oligomer having 2 to 6 functional groups are used in many cases.

The acid oligomer is synthesized through a reaction of an epoxy-acrylate or methacrylate obtainable by ring-opening esterification of a poly-epoxy compound and an acrylic acid or methacrylic acid as starting materials, with a cyclic acid anhydride to introduce a carboxyl The epoxy-(meth)acrylates includes aliphatic epoxy-(meth)acrylates such as (meth)acrylic acid derivatives of neopentyl glycol diglycidyl ether, (meth)acrylic acid derivatives of 1,6-hexanediol diglycidyl ether, (meth)acrylic acid derivatives of trimethylol propane triglycidyl ether, and the like; aromatic epoxy-acrylates such as (meth)acrylic acid derivatives of bisphenol A glycidyl ether, (meth)acrylic acid derivatives of epoxyphenolnovolak, (meth)acrylic acid derivatives of phthalic acid glycidyl ether, and the like.

The cyclic acid anhydride to be used for the purpose of introducing a carboxyl group into the epoxy-acrylate, may include succinic anhydride, maleic anhydride, dodecynyl succinic anhydride, phthalic anhydride, trimellitic anhydride, tetrahydrophthalic anhydride, hexahydrophthalic anhydride and the like. The products thus created are pendented in a half-esterified form of hydroxyl groups in the epoxy-acrylate by the act of the acid anhydride.

The acid oligomer may be used singularly or in a mixture of more than 2 types. The amount of application of the acid oligomer is determined depending upon the performance required for the ultimate physical properties of cured film of this ink composition. Taking this point in terms of acid value, the mixing ratio and mixing amount must be determined so that the acid value of whole vehicle may be from 5 to 100, preferably in the range of 20 to 50.

The ingredient (D) for the present vehicle mixture in the radiation-curable ink composition according to the present invention is at least one ingredient selected from the group consisting of (a) a double bond-containing fluorinated carboxylic ester, (b) a block copolymer comprising a fluorinated alkyl group-containing polymer segment and a (meth) acrylic polymer segment, (d) a block copolymer comprising a siloxane group-containing polymer segment and a (meth) acrylic polymer segment, and mixtures thereof.

The water-repellent double bond-containing fluorinated carboxylic esters wherein the fluorine component in the copolymer is oriented on the surface of the copolymer molecule include fluorinated alcoholic residue-containing esters such as trifluoroethyl (meth)acrylate, tetrafluoropropyl (meth)acrylate, octafluoropentyl (meth)acrylate, heptadecafluorodecyl (meth)acrylate and the like as well as fluorinated macro-monomers wherein the base chain has a fluorine group and the side chain is pendented with an acryloyl group, such as UNIRESIN™ series products manufacturered by Shin-Nakamura Kagaku Kogyo Co., Japan.

These double bond-containing fluorinated carboxylic esters form a film wherein the fluorine components in these double bond-containing fluorinated carboxylic esters are oriented on the surface thereof, to give the film water-repellency, chemical resistance and soil resistance. Furthermore, the film has the effect of facilitating penetration of an aqueous alkaline solution along the interface between the cured ink film and the base since polar groups are pushed toward the base.

The double bond-containing fluorinated carboxylic acid ester is combined in the range of 1 to 20 parts by weight per 100 parts of vehicle, and preferably 3 to 1 0 parts or so.

In cases where the amount of the double bond-containing fluorinated carboxylic ester is insufficient, the chemical resistance, repellency and soil resistance of the ink surface is adversely affected, thus making it difficult to maintain the value of the printed product at the distribution stage. In cases where it is excessive, the ink has deteriorated recoating ability, which makes multi-color printing difficult. Since such ink will be too water-repellent, it is much detrimental to the infiltration of an aqueous alkaline solution for ink removal, thus lowering work efficiency.

In the case of the block copolymer made of a fluorinated alkyl group-containing polymer segment and a (meth) acrylic polymer segment (fluorine-containing block copolymer ), the (meth)acrylic copolymer segment is dissolved, on the contrary, in the radiation-curable vehicle taking advantage of the high degree of surface orientation of the fluoro group contained in the molecule and eventually caught firmly within the hardened substance after curing. Therefore, the cured film will get durable water-repellency, chemical resistance, soil resistance and abrasion resistance and, concurrently, the polar group in the vehicle is condensed at the side of the base, thus improving the effect on infiltration of an aqueous alkaline solution along the interface between the hardened film and the base.

On the (meth)acrylic polymer segment contained in the fluorinated block copolymer, various functional groups such as an amino group, alkylamino group, epoxy group, hydroxyl group, carboxyl group etc. can be introduced by selection of (meth)acrylic monomers. The fluorinated block copolymer carrying those functional groups can be optionally selected and utilized depending upon the physical properties required for the film product. When the acid group capable of forming an alkali metal salt, like a carboxyl group, is included, the application amount is limited in the range of acid values such as from 5 to 100, otherwise it may affect the acid value of the vehicle mixture.

These fluorinated block polymers are, for example, Modiper F™ series products manufacturered by Nippon Yushi Co., Japan. The actual application amount of the fluorinated block polymer is 1 to 10 parts by weight per 100 parts by weight of the vehicle, but preferably about 3 to 7 parts. A predetermined amount of the fluorinated block polymer is dissolved beforehand in the ingredient (F) which will ultimately constitute the vehicle composition, followed by addition to the vehicle.

The block copolymer consisting of a siloxane group-containing polymer segment and a (meth)acrylic polymer segment (siloxane-containing block copolymer) can be used since it indicates good surface orientation. This siloxane-containing block copolymer is capable of affording not only water-repellency but also detachment ability from the mold and abrasion resistance as it indicates better surface orientation similar to those of the fluorine-containing block copolymer. Although the water-repellency of the siloxane-containing block copolymer is not as strong as that of the fluorine-containing block copolymer, it has excellent abrasion resistance, and the cured ink film using it has a special feature that prevents any scratches during distribution processes of the printed products. Furthermore, it will be effective for the removal of the film with an aqueous alkaline solution as intended by the present invention.

In the case of the siloxane-containing block copolymer, various polar groups as well as mentioned above in the case of fluorinated block polymer can be introduced into a (meth)acrylic polymer segment by selecting a (meth)acrylic monomer. These may be optionally selected and used depending upon the physical film properties ultimately required.

The siloxane-containing block copolymers are, for example, Modiper-FS™ series products manufacturered by Nippon Yushi Co., Japan. The application amount thereof is in the range of 0.05 to 10 parts by weight in 100 parts of the vehicle but preferably 1 to 5 parts by weight under normal circumstances. While it is somewhat inferior in water-repellency to the fluorine-containing block copolymer, an increase in the amount is not necessary to make it up; instead, it is desirable to avoid possible deterioration of recoating ability when using larger amounts. A predetermined amount of this siloxane-containing block copolymer is dissolved beforehand in the ingredient (F) which will ultimately constitute the vehicle composition, followed by addition to the vehicle.

The fluorine-containing block copolymer and/or siloxane-containing block copolymer can be used in combination with the double bond-containing fluorinated carboxylic ester in a composition comprising either two or three of them. In such a case, a synergetic effect including the excellent water-repellency of the siloxane-containing compound and the excellent abrasion resistance of the siloxane-containing block copolymer can be obtained upon combining the two compounds but in the case of such a combination, the amount of the fluorine-containing compound shall be 2 to 4 times that of the siloxane-containing block copolymer so that the intended purpose my be satisfied to the best extent. In the case of such a combination, the overall application amount may be 1 to 10 parts by weight per 100 parts of vehicle, most preferably in the range of 3 to 7 parts by weight.

The ingredient (E) for the present vehicle mixture in the radiation-curable ink composition according to the present invention is a double bond-containing carboxylic ester, having at least 2 double bonds and free of an acid group, provided that this carboxylic ester is excluded from the above-mentioned ingredient (A).

The double bond-containing polycarboxylic esters having no acid group which are excluded from the ingredient (A) are sold commercially as conventionally called a "polyfunctional monomer" or a "polyfunctional oligomer". Typical of those polyfunctional monomers are dihydric alcohol di(meth)acrylates such as ethylene glycol di(meth)acrylate, triethylene glycol di(meth)acrylate, tripropylene glycol di(meth)acrylate, 1,4-butanediol di(meth)acrylate, 1,6-hexanediol di(meth)acrylate, neopentyl glycol di(meth) acrylate, hydroxypivalic acid neopentyl glycol di(meth) acrylate, ethylene oxide-modified bisphenol A di(meth) acrylate, dicyclopentanyl di(meth)acrylate and the like, trihydric alcohol tri(meth)acrylates such as trimethylol ethane tri(meth)acrylate, trimethylol propane tri(meth) acrylate, glycerine tri (meth)acrylate, tris[(meth) acryloxyethyl]isocyanurate and the like; polyhydric alcohol (meth)acrylates such as pentaerythritol tetra(meth)acrylate, ditrimethylol propane tetra(meth)acrylate, dipentaerythritol hexa(meth)acrylate and the like. It can be allowed to contain partially unesterified hydroxy groups upon esterification of trihydric or polyhydric alcohols with (meth)acrylic acids. It can be also allowed to have hydroxy groups produced upon ring-opening esterification of epoxy groups with (meth) acrylic acids.

The polyfunctional oligomers are oligomers excluding the double bond-containing linear polyester oligomers and/or polymers defined as the ingredient (A). Typical of those polyfunctional oligomers are epoxy (meth)acrylate, ethane (meth)acrylate, polyester (meth)acrylate, polyether (meth) acrylate, polybutadiene (meth)acrylate, and the like.

Among epoxy (meth)acrylate, most conventional examples are a bisphenol-type compound of the formula (1):

The urethane (meth)acrylate can be selected from those sold commercially and synthesized by methacrylating or acrylating the terminus of a urethane prepared by combination of the diisocyanate with the polyol.

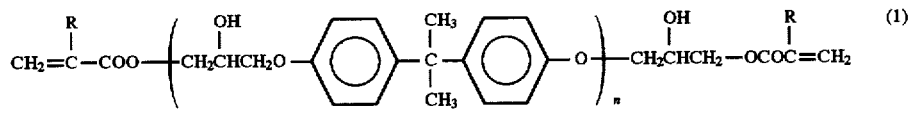

wherein n is 1 to 4 and R is H or $CH_3$, and those wherein the bisphenol skeleton is substituted with bisphenol A, bisphenol F, bisphenol S or the like in the aforementioned formula A phenolnovolak-type epoxy (meth)acrylate having the folumula (2):

The polyester (meth)acrylate is a compound of the formula (5):

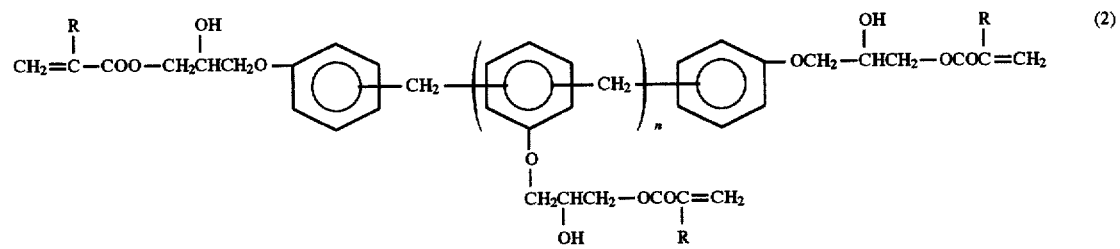

wherein n is 1 to 4 and R is H or $CH_3$, can be used. The oligomers include aliphatic epoxy (meth)acrylates such as epichlorohydrin-modified (poly)alkylene glycol di(meth) acrylates and epoxylated soy bean oil (meth)acrylates, alicyclic epoxy (meth)acrylates such as a compound of the formula (3):

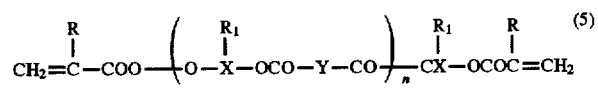

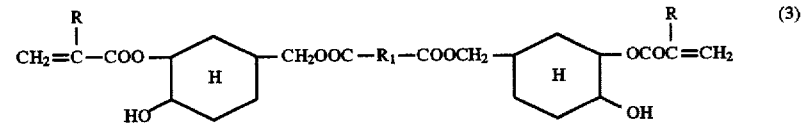

wherein R is H or $CH_3$ and $R_1$ is a residue derived from dicarboxylic compounds by exclusion of —COOH groups therefrom, depending on demand.

The urethane (meth)acrylate includes a compound having the formula (2):

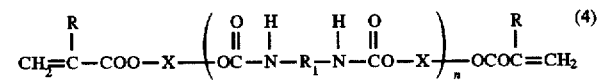

wherein n is 1 to 4, R is H or $CH_3$, $R_2$ is a residue derived from diisocyanates by exclusion of —NCO groups therefrom, and X is a residue derived from polyols by exclusion of OH groups therefrom, etc.

In the formula (4), the isocyanates include aromatic diisocyanates such as trilene diisocyanate, 4,4-diphenylmethane diisocyanate, xylylene diisocyanate and the like, aliphatic diisocyanates such as hexamethylene diisocyanate, trimethylhexamethylene diisocyanate and the like, alicyclic diisocyanates such as isophorone diisocyanate, methylene bis(4-cyclohexylisocyanate) and the like and the polyols includes glycols such as ethylene glycol, propylene glycol, 1,4-butanediol, 1,6-hexanediol, polyglycol ethers, bisphenol ethers such as ethoxylated bisphenol A and the like, spiro glycol, caprolactone-modified diols, carbonated diols and the like.

wherein n is 1 to 5, R is H or $CH_3$, $R_1$ is H or $CH_2=C(R)$ COO—, X is a residue derived from polyols by exclusion of OH therefrom, Y is a residue derived from dicarboxylic compounds by exclusion of —COOH groups therefrom, and the like. A number of such compounds are commercially available and can be selected from those known in the art, depending on requirements.

The polybutadiene (meth)acrylates include those synthesized by methacrylating or acrylating a liquid polybutadiene having at least two terminal hydroxyl groups, and those wherein the hydroxyl group is coupled with a (meth)acrylic ester having a hydroxyl group by using a diisocyanate. Typical of those are commercially available chemicals such as Quinbeam-101™ (Nippon Zeon, Japan), TE™ resins (Nippon Soda, Japan), and MIKERON NU-A™ (Hayakawa Rubber, Japan).

The purpose of using the polyfunctional monomer and/or oligomer is to create three-dimensional cross-linking when polymerization is conducted with radiation and to afford film hardness, gloss, water-tightness, chemical resistance and abrasion resistance.

The above-mentioned polyfunctional monomer and/or oligomer may be used independently but in many cases a mixture including two or more types is added as the vehicle component. The application amount is determined in consideration whether the cross-linking density during the curing process is satisfactory in addition to the other considerations of physical properties thereof such as solubility and viscosity as well as the other vehicle ingredients. Further in accordance with the intended purpose, adjustment of acid values of the vehicle will also be one restrictive condition on the determination of application amount in order to achieve the elimination with alkali (which is the very subject of the present invention). In many cases, 5 to 20 parts by weight of the polyfunctional monomer and/or oligomer per 100 parts of the vehicle is used, but in case of excessive application, removable stress may occur due to cross-linking contraction during a curing process and the ability of adhering to the base may be hampered.

The ingredient (F) for the present vehicle mixture in the radiation-curable ink composition according to the present invention is at least one ingredient selected from the group consisting of a one double bond-containing carboxylic ester free of an acid group; a one double bond-containing carboxylic amide free of an acid group; a one double bond-containing carboxylic imide free of an acid group; and mixtures thereof.

The double bond-containing carboxylic ester and/or amide and/or imide having a single radiation-curable double bond and free of an acid group in a single molecule is called a "monofunctional monomer" among monomers contained in the radiation-curable type resin compositions. The monofunctional monomer is used mainly as a diluent to adjust viscosity in the composition. A number of monofunctional monomers are known in the art. Typical of those monofunctional monomers are 2-ethylhexyl (meth)acrylate, cyclohexyl (meth)acrylate, dicyclopentanyl (meth)acrylate, benzyl (meth)acrylate, phenoxyethyl (meth)acrylate, tolyloxyethyl (meth) acrylate, ethoxyethyl (meth) acrylate, ethylcarbitol (meth)acrylate, isobornyl (meth)acrylate, methoxypropylene glycol (meth) acrylate, acryloylmorpholine, N-vinylpyrrolidone, N-vinylcaprolactam, N,N-diethylaminoethyl (meth) acrylate, t-butylaminoethyl (meth)acrylate, etc.

Furthermore, the adhesiveness of the monofunctional monomer is remarkably improved in cases it includes a polar group such as a hydroxyl group, epoxy group, phosphoric ester group and the like in its molecule, which may be utilized to the extent not to deteriorate water-tightness in the present invention.

Such monofunctional monomers include 2-hydroxyethyl (meth)acrylate, 2-hydroxypropyl (meth)acrylate, 3-butoxy-2-hydroxypropyl (meth)acrylate, caprolactone-modified 2-hydroxyethyl (meth)acrylate, 3-phenoxy-2-hydroxypropyl (meth) acrylate, glycidyl (meth) acrylate, ethylene oxide-modified butoxylated phosphoric acid (meth) acrylate, etc.

These monofunctional monomers are applied alone or in admixture with two or more components. The amount of monomer can vary between 5 and 40 parts per 100 parts of the ink vehicle. The viscosity may be conventionally controlled between 10 and 30 parts of the monofunctional monomers.

The aforementioned ink vehicle components are mixed in the desirable ratio determined through experiments to produce ink vehicles. The composition ratio is determined by adjusting the acid value from about 5 to 100 in order to achieve the prime purpose of the present invention which is to remove with an aqueous alkaline solution. In producing the ultraviolet-curable type ink by using the vehicle so obtained, a photopolymerization initiator, a photosensitizer, an organic and/or inorganic pigment and other additives can be added, but in case of applying EB (electron beam) curing, the photopolymerization initiator and the photosensitizer are not necessary.

A number of photopolymerization initiators which can be used in ultraviolet-initiated polymerization are known in the art. Typical of those available initiators include benzophenone, diethoxyacetophenone, 1-hydroxycyclohexyl phenyl ketone, 2-methyl-(4-methylthiophenyl)-2-morpholinopropan-1-one, benzoylalkyl ether, benzil, benzildimethylketal, camphorquinone, 2-ethylanthraquinone, methyl benzoylbenzoate, 4-phenylbenzophenone, 3,3'-dimethyl-4-methoxybenzophenone, thioxanethone, 2,4-diethylthioxanthone, methyl phenylglyoxylate, benzoylphosphine oxide, 1-trimethylbenzoyldiphenylphosphine oxide, etc.

Typical of known photosensitizers are triethanolamine, methyldiethanolamine, triisopropanolamine, 4,4'-diethylaminobenzophenone, ethyl 4-dimethylaminobenzoate, n-butoxyethyl 4-dimethylaminobenzoate, isoamyl 4-dimethylaminobenzoate, etc.

The above-mentioned photopolymerization initiator may be used alone but, in many cases, its photopolymerizability is improved in a combined use with the photosensitizer. The most suitable photo-polymerization initiator and photosensitizer can be selected depending upon the vehicle composition to be applied. The standard applicable to such selection is curing speed, coloration during curing processes, existence of combined use of pigment, strength of odor after curing and the like, which is modified upon studies reflecting respective purposes. The application amount can range from 1 to 20 parts by weight for the photo-polymerization initiator and photosensitizer respectively as against the ink vehicle as a whole but it is not preferable to use a large amount in view of the resultant effect that the molecule weight will not increase and the strength of the cured film will deteriorate and undesirable strong odor will be generated though curing progress will get accelerated. The most preferable application range is 2 to 10 parts by weight in combination use of both of them. In such case, the amount ratio between the photopolymerization initiator and photosensitizer to be required varies depending upon the type and composition of the vehicle available. Also, in the case of the ink which includes an additional coloring pigment described below, the said ratio has to be changed reflecting the unique ultraviolet absorption ability of the pigment.

The pigment is roughly classified into an organic pigment and an inorganic pigment according to the chemical composition. It can be also classified into a colored pigment and a colorless pigment (extender) in view of the application. With reference to radiation-curing, the role of the end use classification is more important.

Among the colored pigments, the inorganic pigments include white pigments such as white lead, zinc oxide, zinc sulfide, titanium dioxide and the like, blue pigments such as ultramarine blue, iron blue, cobalt blue and the like, green pigments such as chromium oxide, verdian, chrome green and the like, chrome yellow, titan yellow, iron oxide yellow, molybdate orange, cadmium pigments, yellow to red pigments such as red oxide, black pigments such as iron black, titan black, carbon black and the like, metal pigments such as aluminium powder and bronze powder, pearl pigments such as mica. However, there are many types of inorganic pigment which can not be used for sanitary reasons. Thus, a harmless one is selected from the above-mentioned pigments. The organic pigments include monoazo-pigments, diszo-pigments, condensed azo-pigments, indanthrone pigments, indigo pigments, thioindigo pigments, quinacridone pigments, phthalocyanine pigments, dioxazine pigments, isoindolinone pigments, pyrrolopyrrole pigments and the like. It is desirable to select the pigment with fast color having strong light resistance in compliance with the radiation curing method.

The application amount of the above pigments varies depending on the intended color depth but in most cases it falls in the range of 0.5 to 50 wt% per total ink composition volume. While the amount is restricted by coloring strength, being the pigment specificity, it ranges from 15 to 60 wt% in the case of titanium dioxide (representative white pigment), and from 3 to 6 wt% in the case of carbon black (black pigment). In the case of an organic pigment, 3 to 10 wt% is desirable in order to attain distinct color and 4 to 6 wt% is desirable when curing is conducted with ultraviolet radiation. Generally speaking, the vehicle the vehicle mixture according to the present invention has better dispersing ability since it contains many polar groups like a carboxyl group. However, in order to achieve still better coloration, a large amount of pigment is combined with the vehicle containing a small amount of pigment dispersing agent, thus creating a condition physically susceptible to crushing pressure by utilizing improvement in the viscosity owing to its oil absorption, followed by sufficiently kneading with the conventional medium dispersing equipment in the coloring material production industry, such as a ball mill or roll mill. When the ink is composed by mixing, the resultant dispersed pigment (toner) in a high concentration is adjusted with the additional vehicle to meet the predetermined pigment density.

Therefore, in embodiments of the present invention, the radiation-curable type ink may preferably contain from 0 to 100 parts of the organic and/or inorganic pigment per 100 parts by weight of the vehicle mixture. Smaller amounts, such as from 0 to 60 parts by weight pigment, or 0 to 50 parts by weight pigment, per 100 parts by weight vehicle mixture, are also preferred in some embodiments.

For the radiation-curable type ink component employed in the present invention, which is detachable with alkali after curing, various colorless pigments (extenders) my be utilized for the purpose of maintaining the special feature as a printing ink such as viscosity, fluidity and thixotropy, of maintaining and increasing ink thickness, and of affording contraction buffer while curing, surface dull-finishing, and slipperiness, as well as of improving film strength. The popular extenders include inorganic types such as talc, kaolin, silica, precipitated barium sulfate, precipitated calcium carbonate, alumina white, white carbon and the like, and waxes such as polyethylene wax, polypropylene wax, polyfluorinated polyethylene wax and the like, and fine powders of artificial and/or natural polymers such as a polyamide resin, polyimide resin, reelamine resin, or benzoguanamine resin, cellulose, collagen and the like. The amount of those pigments my be optionally determined in compliance with the respective purposes. A surfacer (leveling agent) and/or defoamer (anti-foaming agent) may be included in the radiation-curable type ink composition according to the present invention which is detachable with alkali in order to adjust the finishing condition of the cured film. These agents shall be selected from the various types of surfacers and defoamers available in the market through experiments as to whether they are well compatible to the vehicle composition and provide surface smoothness. Application types or amounts thereof never impose a restriction on the contents of the ink composition according to the present invention, and they may be determined from time to time, but normally as a total amount of the surfacer and/or defoamer, they are used at 0.5 to 5 wt% per overall volume of ink.

In addition, an ultraviolet absorbing agent, a wetness-improving agent, an anti-oxidizing agent and the like my be employed as the case may be.

The ink using the radiation-curable type ink composition according to the present invention which is detachable with alkali after curing is used mainly for a screen printing method but it may be applicable to other printing methods such as flexography and gravure printing when it is adjusted to have less viscosity with the help of an organic solvent or a mixture thereof.

The cured printings with the radiation-curable type ink having a removable nature by alkaline water on polyethylene terephthalate resins can be easily removed by dipping it in an aqueous strong alkaline solution such as sodium hydroxide and potassium hydroxide for a short time and no drastic treatment such as hydrolysis of polyethylene terephthalate is required. For removal, there are several steps ranging from dissolving detachment to filmy detachment, which make it possible to attain the intended performance by controlling the amount ratio of (B), (C) and (D). In any case, selection of detachment conditions is determined considering the method of waste treatment after removal. After detachment the polyethylene terephthalate resin can be recovered in a condition clean enough for regeneration and re-used through rather a simple method such as washing with water and drying.

The method for printing letter, design, figure and the like with the above-mentioned printing ink includes a silk-screen printing method. In this method, in general, a silk-screen with the range of 254 to 330 mesh is normally utilized. A roughened surface of the plastic product may be preferably printed with the printing ink.

Further, the ultraviolet radiation on the printing surface with the printing ink containing the said radiation-curable resin vehicle is conducted normally using a high pressure mercury-vapor lamp or metal halide lamp and the like, wherein its wavelength is 200 to 450 nm or so. The integrated ultraviolet exposure is preferably in the range of 100 to 500 mj/cm$^2$. Also, in the case of electron radiation, the radiation amount is normally in the range of 10 to 100 KGy, preferably in the range of 30 to 60 KGy.

The following working examples, preparation examples, and reference examples are intended to illustrate the invention in further detail and should by no means be construed as limiting the scope of the invention.

PREPARATION EXAMPLE 1

A double bond-pendent linear polyester oligomer and/or polymer which can be used in the following Working Examples is prepared by urethane-acrylating the copolymerized polyester polyols of the following composition (1) with the following compositions (2):

| (1) Copolymerized polyester polyol | | |
|---|---|---|
| | A | B |
| (Dicarboxylic acid component) | | |
| Terephthalic acid | 30 | 50 |
| Isophthalic acid | 30 | 50 |
| Orthophthalic acid | 40 | — |
| (Glycol components) | | |

-continued

(1) Copolymerized polyester polyol

|  | A | B |
| --- | --- | --- |
| Ethylene glycol | 55 | 50 |
| Neopentyl glycol | 45 | 50 |
| Molecular weight of copolymer | 1900 | 3000 |
|  | (part by weight) | |

(2) A double bond-containing oligomer and/or polymer

|  | A-1 | B-1 |
| --- | --- | --- |
| (Copolymerized polyester polyol components) | | |
| A | 100 | |
| B | | 100 |
| (Polyisocyanate components) | 28 | 27 |
| Isophorone diisocyanate | | |
| (Hydroxyl group-containing methacrylic or acrylic esters) | | |
| Pentaerythritol triacrylate | | 40 |
| 2-Hydroxyethyl acrylate | 13 | |
| Molecular weight | 2500 | 3600 |
|  | (part by weight) | |

PREPARATION EXAMPLE 2

A double bond and carboxyl group-containing carboxylic ester is prepared as follows:

(a)

Bisphenol A glycidyl ether (190.0 g, 190.0 epoxy equivalents), acrylic acid (75.0 g, 1.05 mol), dimethylbenzylamine (2 g) and p-methoxyphenol (0.2 g) were placed in a flask equipped with a thermometer, stirrer and reflux condenser and dissolved homogeneously followed by heating to 80° C. and standing for 24 hours to afford an epoxy acrylate with 10.3 acid value. Then, the product was reacted with phthalic anhydride (140.6 g, 0.95 mol) and the mixture stood at 80° C. for 5 hours to produce a bisphenol A epoxy acrylate-phthalic ester (viscous pale yellow product, 130.7 acid value).

(b)

Epoxy novolak resins (190.0 g, 190.0 epoxy equivalents), acrylic acid (75.0 g, 1.05 mol), tetramethylanmonium chloride (2.0 g) and p-methoxyphenol (0.2 g) were placed in a container similar to the above (a) and dissolved homogeneously followed by heating to 80° C. and standing for 24 hours to afford an epoxy acrylate with 10.5 acid value. Then, the product was reacted with succinic anhydride (95 g, 0.95 mol) and the mixture stood at 80° C. for 5 hours to produce an epoxy novolak acrylate- succinic ester (viscous pale yellow product, 145.2 acid value).

(c)

Glycerine triglycidyl ether (150.0 g, 150.0 epoxy equivalents), acrylic acid (75.0 g, 1.05 mol), tetrabutylphosphonium bromide (2.0 g) and p-methoxyphenol (0.2 g) were placed in a container similar to the above (a) and dissolved homogeneously followed by heating to 80° C. to afford an epoxy acrylate with 9.5 acid value. Then, the product was reacted with hexahydrophthalic anhydride (145 g, 0.95 mol) and the mixture stood at 80° C. for 5 hours to produce a glycerine epoxy acrylate-hexahydrophthalic ester (viscous pale yellow product, 141.3 acid value).

REFERENCE EXAMPLE 1

The double bond-containing oligomer obtained in Preparation Example 1, B-1 (24.4 g), an aliphatic urethane hexaacrylate (7.8 g, Daicel UCB Ebecryl '1290K), a fluorine-containing macro-monomer (25.7 g, Shin-Nakamura Kagaku Kogyo Co. UNIRESIN™ FC-300), monoacryloyloxyethyl phthalate (6.3 g), the bisphenol A epoxy acrylate-phthalic ester obtained in PREPARATION EXAMPLE 2, (a) (3.2 g), trimethylol propane triacrylate (2.0 g), phenoxyethyl acrylate (14.2 g), and acryloylmorpholine (16.2 g) were mixed to give a vehicle mixture with 17.6 acid value.

One hundred parts of the vehicle were admixed with 15 parts of mistrone vapor talc, 10 parts of benzildimethyl ketal, 5 parts of dimethylaminobenzoic acid ethyl ester, 3 parts of polyethylene wax powders and 1 part of a surfacer, BYK-306™ (Byk-Mallinckrodt Chemische Produkte GmbH) and 0. 1 part of a thermal polymerization inhibitor, phenothiazine and the mixture was treated by a roll mill to produce a colorless ink with dispersion particle sizes of less than 5 micros.

WORKING EXAMPLE 1

An untreated polyethylene terephthalate sheet was screen printed with the ink obtained in Reference Example 1 by means of a 300 mesh Tetron™ screen and the printed product was radiated with a 720 W/cm metal halide lamp to the extent of integrated ultraviolet exposure of 200 mj/cm$^2$ to obtain a cured film. The film so prepared did not show any sign of exfoliation at a peel-off test with a cellulose adhesive tape but it showed close adhesion to the base.

When the cured film prepared under the same condition was kept in a 2% aqueous solution of sodium hydroxide at 70° C. for 20 minutes, the cured film detached in filmy form and no trace of prints was observed on the polyethylene terephthalate base.

REFERENCE EXAMPLE 2

The double bond-containing oligomer obtained in Preparation Example 1, B-1 (177 g) was dissolved in 118 g of phenoxyethyl acrylate, and the resultant solution was mixed with a pigment disperser (1.5 g, SOLSPERSE™ 24000/ SOLSPERSE™ 5000=2/1, manufactured by ICI, Great Britain), followed by addition of Heliogen Blue-L-7080™ (52.3 g, manufactured by BASF). The mixture was kneaded extensively with a roll mill to produce toners with dispersion particle sizes of less than 5 microns.

The toners thus obtained (41.6 g) were well mixed with dipentaerythritol hexaacrylate (8.4 g), trimethylol propane triacrylate (4.6 g), trimethylol propane triepoxy-acrylate (4.6 g), monoacryloyloxyethyl phthalate (8.7 g), the glycerine epoxy acrylate-hexahydrophthalic ester obtained in Preparation Example 2, (c) (2.2 g), octafluoropentyl acrylate (8.8 g), and acryloylmorpholine (21.0 g) to give colored ink vehicles (with 21.5 acid value).

One hundred parts of the colored ink vehicle were admixed with 3.0 g of a photopolymerization initiator, diethylthioxanthone, 3.0 g of a photosensitizer, isoamyl 4-dimethylaminobersoate, 35 g of precipitated barium sulfate, 3 g of fluorinated polyethylene wax, 2 g of a surfacer (VERSA-FLOW BASE™ manufactured by Shamrock Chemicals Corp.), 0.04 g of a thermal polymerization inhibitor, p-methoxyphenol and well mixed by stirring followed by kneading by a roll mill to give a homogenous blue ink.

WORKING EXAMPLE 2

An untreated polyethylene terephthalate sheet was screen printed with the ink obtained in Reference Example 2 in the same manner as described in Working Example 1 and the printed product was radiated with a 120 W/cm metal halide lamp to the extent of integrated ultraviolet exposure of 300 mj/cm² to obtain a cured film. The film so prepared did not show any sign of exfoliation at a peel-off test with a cellulose adhesive tape but it showed close adhesion to the base.

When the cured film prepared under the same condition was kept in a 2% aqueous solution of sodium hydroxide at 70° C. for 20 minutes, the cured film detached in filmy form and no trace of prints was observed on the polyethylene terephthalate base.

REFERENCE EXAMPLE 3

The double bond-containing oligomer obtained in Preparation Example 1, B-1 (14.2 g), an aliphatic urethane hexaacrylate (4.9 g), a fluorine-containing macro-monomer (5.9 g), monoacryloyloxyethyl succinate (4.5 g), the epoxy novolak acrylate-succinic ester obtained in Preparation Example 2, (b) (2.5 g), trimethylol propane triepoxyacrylate (3.9 g), tolyloxyethyl acrylate (3.9 g), phenoxyethyl acrylate (9.4 g), and acryloylmorpholine (9.8 g) were mixed to give an ink vehicle mixture with 25.8 acid value.

A pigment dispersing agent, Disperbyk-110™ (0.5 g, manufactured by Byk-Mallinckrodt Chemische Produkte GmbH) was added to the ink vehicle mixture and the resultant mixture was mixed homogeneously by stirring. Then, 30.0 g of titanium oxide, TIPAQUE CR-580™ (Ishihara Sangyo Kaisha Ltd., Japan), 6.0 g of a photopolymerization initiator acylphosphine oxide, 2.0 g of fluorinated polyolefin wax, 1.5 g of a surfacer, VERSA-FLOW BASE™ (manufactured by Shamrock Chemicals Corp. ), 1.0 g of a defoamer, AQUALEN™ (manufactured by Kyoeisha Chemicals Co., Japan), and 0.04 g of a thermal polymerization inhibitor, p-methoxyphenol were added to the mixture followed by stirring for a while and the product was kneaded by a roll mill to give an ink with dispersion particle sizes of less than 5 microns. WORKING EXAMPLE 3

An untreated polyethylene terephthalate sheet was screen printed with the ink obtained in Reference Example 3 in the same manner as described in Working Example 1 and the printed product was radiated with a 120 W/cm metal halide lamp to the extent of integrated ultraviolet exposure of 300 mj/cm² to obtain a cured film. The film so prepared did not show any sign of exfoliation at a peel-off test with a cellulose adhesive tape but it showed close adhesion to the base.

When the cured film prepared under the same condition was kept in a 2% aqueous solution of sodium hydroxide at 70° C. for 30 minutes, the cured film detached in filmy form and floated in the solution. No trace of prints was observed on the polyethylene terephthalate base. The aqueous sodium hydroxide solution phase was colorless and transparent.

WORKING EXAMPLE 4

A detachment test was conducted by dipping the ink obtained in the same manner as described in Reference Example 1, in an alkaline solution. At the same time, a comparison was also carried out with the detachment characteristics of the prior art ink currently available in commercial use upon dipping it in an alkaline solution.

The following test samples were used:
Vessel:
 2.7 liter untreated polyethylene terephthalate vessel
  Weight 110 g, Printing area 150 cm², Surface area 900 cm²

Ink
 ① Prior art ink (A)
 ② Ink (B) obtained in the same manner as described in Reference Example 1

Screen printing was conducted with the respective above-mentioned ink on the surface of a vessel body made of untreated polyethylene terephthalate, using a 350 mesh nylon screen, and then radiation in the integrated amount of ultraviolet exposure, 150 mj/cm², was applied by means of a 120 W/cm metal halide lamp to form cured films. The said respective film did not show any sign of exfoliation at the peel-off test with a cellulose adhesive tape but it indicates good adhesiveness. Elimination test was conducted on the respective cured film prepared under the same condition by dipping it in an alkaline solution according to the following procedures:
Conditions

| Dipping solution | Aqueous sodium hydroxide solution | | | |
|---|---|---|---|---|
| | 0.1% | 1% | 5% | |
| Dipping temperature | 20° C. | 50° C. | 80° C. | |
| Dipping term | 1 min. | 5 min. | 20 min. | 50 min. |

Items to be confirmed are detachment properties in the case of natural separation and rubbing elimination with a gauze.

The evaluation on the detachment properties in the test includes the results of natural detachment and rubbing elimination with a gauze, of the printed parts, as follows:
Evaluation

| ⊚ | Complete natural detachment in a solution and no residual printed part thereon. |
|---|---|
| ○ | No residual printed part thereon after natural detachment and rubbing elimination with a gauze |
| Δ | More than a half of printed parts thereon remains after natural detachment and rubbing elimination with a gauze |
| Δx | Natural detachment takes place in part but merely less than a half of printed parts is removed even after rubbing elimination with a gauze |
| x | No natural detachment takes place and only less than a half of printed parts is removed even with rubbing with a gauze |
| xx | Upon rubbing with a gauze, discoloration occurs but no detachment of printed parts |
| xxx | Upon rubbing with a gauze, neither discoloration nor detachment of printed parts takes place |

TABLE 1

| | | Dipping soln. | | | | | |
|---|---|---|---|---|---|---|---|
| | | 0.1% | | 1% | | 5% | |
| Temp. | Term | A | B | A | B | A | AS-61 |
| 20° C. | 1 min. | xxx | xx | xxx | xx | xx | xx |
| | 5 min. | xxx | xx | xx | xx | xx | xx |
| | 20 min. | xxx | xx | xx | xx | xx | xx |
| | 50 min. | xxx | xx | xx | Δx | xx | Δ |
| 50° C. | 1 min. | xxx | xx | xxx | xx | xx | xx |
| | 5 min. | xxx | xx | xx | xx | xx | xx |
| | 20 min. | xxx | xx | xx | Δx | xx | ○ |
| | 50 min. | xxx | xx | xx | Δ | xx | ⊚ |
| 80° C. | 1 min. | xxx | xx | xx | xx | xx | x |
| | 5 min. | xxx | Δx | xx | ○ | xx | ⊚ |
| | 20 min. | Δ | Δ | Δ | ⊚ | Δ | ⊚ |
| | 50 min. | Δ | Δ | Δ | ⊚ | Δ | ⊚ |

In the case of ink (B), complete natural detachment was observed in 5 to 20 minutes after dipping prints in a 1% aqueous solution of sodium hydroxide at 800° C.

Furthermore, it is possible to remove the printed part in a higher pH solution by extending dipping time even in somewhat lower temperature.

WORKING EXAMPLE 5

The printed vessel was prepared in the similar manner as described in Working Example 2, using the same test sample as in the case of Working Example 4, and crushed to about 1 cm cubes to produce flaky test materials (200 kg).

As the next step, the detachment properties were determined in a refining process practically applied to the collected polyethylene terephthalate flakes.

The refining process includes the following principle steps:

① Wind separation: Removal of paper and fine powders with a cyclone

② Float-and-sink separation: Gravity Separation in a water tank

③ Cleaning with alkali: Dipping in a tank containing an aqueous solution of sodium hydroxide (pH 11.5~12, 6,000 l) at 80° C. for 10 and 20 minutes ④ Washing: Washing in a water tank for 20 minutes ⑤ Wind separation after drying ⑥ Finished product The results are summarized in Table 2.

TABLE 2

|  | Ink (A) 100% 80 kg | Ink (B) 100% 80 kg | Ink (A) + Clear PET 7% + 93% 14 kg + 186 kg |
|---|---|---|---|
| 10 min. | — | ⊙ | ⊙ |
| 20 min. | x | ⊙ | — |

⊙ No observation of ink stained flakes
x Co-existence of a number of ink stained flakes

REFERENCE EXAMPLE 4

The double bond-containing oligomer obtained in Preparation Example 1, B-1 (19.6 g), phenoxyethyl acrylate (19.7 g), tolyloxyethyl acrylate (6.6 g), acryloylmorpholine (16.1 g), trimethylol propane triepoxyacrylate (6.6 g), 6 functional group-containing urethane BERYL™ K1290 (8.2 g, manufactured by DAICEL, UCB Co., Ltd), monoacryloyloxyethyl phthalate (7.2 g), the bisphenol A epoxy acrylatephthalic ester obtained in Preparation Example 2, (a) (2.0 g), and the block copolymer solution (12.0 g) which is prepared by mixing and dissolving acryloylmorpholine (71.0 wt%), a fluorine-containing block copolymer, Modiper F600™ (20.5 wt%, Nippon Yushi Co., Japan) and a silomane-containing block copolymer, Modiper FS700™ (8.5 wt%, Nippon Yushi Co., Japan), were mixed by stirring to give homogeneous vehicles with 17.9 acid value.

Then, a pigment disperser, Anti-Terra-U™ (0.2 g, manufactured by Byk-Mallinckrodt Chemische Produkte GmbH) and p-methoxyphenol (0.05 g) were dissolved in the vehicle (92.0 g) in advance, followed by dispersing Raven 450™ (1.5 g, manufactured by Columbian Chemicals Co.), Raven 1350™ (1.5 g, manufactured by Columbian Chemicals Co.) and Titan Black 10S™ (5.0 g, manufactured by Mitsubishi Material Co., Japan) and kneading by a roll mill extensively to afford coloring vehicles with dispersion particle sizes of less than 5 microns.

To 96.5 g of the coloring vehicle were added 2.0 g of a fluorinated polyolefin wax, 0.5 g of a surfacer, BYK-306™ (manufactured by Byk-Mallinckrodt Chemische Produkte GmbH) and 1.0 g of a defoamer, Aqualene™ (manufactured by Kyoeisha Yushi K.K., Japan), and the resultant mixture was stirred extensively by a dissolver to produce a black ink for EB curing.

WORKING EXAMPLE 6

An untreated polyethylene terephthalate sheet was screen printed with the black ink thus obtained by means of a 330 mesh screen and the printed ink was cured in 6 Mrad (165 KV, 3.2 mA, 10 m/min.) with an EB radiation device, CB250/15/180L™ (manufactured by Iwasaki Denki K.K., Japan) to form a tack-free cured coating film. The film so prepared did not show any sign of exfoliation at a peel-off test with a cellulose adhesive tape but it showed close adhesion to the base.

When the cured film was dipped in a 5% aqueous solution of sodium hydroxide at 80° C. for 5 minutes, the cured film detached in filmy form completely from the base. Neither trace of prints nor any sign of erosion by an aqueous alkaline solution was observed on the polyethylene terephthalate base.

REFERENCE EXAMPLES 5–8

Following the same procedures as in Reference Examples 1–4, four additional radiation-curable ink compositions are prepared. Each of the liquid vehicles for the ink compositions have the following composition:

| Component | Parts by weight |
|---|---|
| Preparation Example 1 A-1 | 24.1 |
| monoacryloyloxyethyl succinate | 7.6 |
| Preparation Example 2 (b) | 4.3 |
| fluorine macromer UNIRESIN FC-200 ™ | 10.0 |
| aliphatic urethane hexaacrylate | 8.3 |
| trimethylol propane triepoxy acrylate | 6.6 |
| tolyloxyethyl acrylate | 6.6 |
| phenoxyethyl acrylate | 15.9 |
| acryloylmorpholine | 16.6 |
| Total | 100.0 |

The liquid vehicle has an acid value of 25.8

In producing the radiation-curable ink compositions, a pigment, dispersing agent, photopolymerization initiator, photosensitizer, surfacer, defoamer, wax and thermal polymerization inhibitor are also used, as described in Reference Examples 1–4, above. The components used in Reference Examples 5–8 are as follows:

|  | Reference Example # | | | |
|---|---|---|---|---|
|  | Ex. 5 | Ex. 6 | Ex. 7 | Ex. 8 |
|  | | Color | | |
| Component | White | Yellow | Red | Blue |
| Liquid vehicle | 100.0 | 100.0 | 100.0 | 100.0 |
| titanium dioxide TIPAQUE CR-580 ™ | 50.8 | | | |
| NOVAPERM RED F3RK-70 ™ (Hoechst) | | | 12.6 | |
| HELIOGEN BLUE-L-7080 ™ | | | | 12.6 |
| IRGAZIN YELLOW 2GLTE ™ (Ciba Geigy) | | 12.6 | | |
| Disperbyk-110 ™ | 0.8 | | | |
| Disperbyk-160 ™ | | 0.6 | 0.6 | 0.6 |

-continued

| | Reference Example # | | | |
|---|---|---|---|---|
| | Ex. 5 | Ex. 6 | Ex. 7 | Ex. 8 |
| | | Color | | |
| Component | White | Yellow | Red | Blue |
| acylphosphine oxide | 10.2 | | | |
| diethylthioxanthone | | 3.8 | 3.8 | 3.8 |
| isoamyl 4-dimethylamino-benzoate | | 3.8 | 3.8 | 3.8 |
| VERSA-FLO BASE ™ | 2.5 | 1.9 | 1.9 | 1.9 |
| AQUALEN N ™ | 1.7 | 2.2 | 2.2 | 2.2 |
| fluorinated polyethylene wax | 3.4 | 2.5 | 2.5 | 2.5 |
| p-methoxyphenol | 0.05 | 0.05 | 0.05 | 0.05 |

Untreated polyethylene terephthalate sheets are screen printed and tested as in Working Examples 1–3 and 6. The sheets do not show signs of exfoliation at a peel-off test with a cellulose adhesive tape, but instead show close adhesion to the base. The cured films are then detached from the base. The films show no traces of prints or signs of erosion after dipping the cured films in a 5% aqueous solution of sodium hydroxide at 80° C. for 5 minutes.

REFERENCE EXAMPLES 9–12

Following the same procedures as in Reference Examples 1–4, four additional radiation-curable ink compositions are prepared. The liquid vehicles for the ink compositions have the following compositions:

| | Parts by weight | |
|---|---|---|
| Component | Ex. 9 | Ex. 10–12 |
| Preparation Example 1 B-1 | 19.7 | 19.6 |
| monoacryloyloxyethyl succinate | 7.1 | 7.1 |
| Preparation Example 2 (a) | 1.9 | 2.0 |
| block copolymer solution* | 13.9 | 14.0 |
| aliphatic urethane hexaacrylate | 8.2 | 8.2 |
| trimethylol propane triepoxy acrylate | 6.7 | 6.7 |
| tolyloxyethyl acrylate | 6.7 | 6.7 |
| phenoxyethyl acrylate | 19.7 | 19.6 |
| acryloylmorpholine | 16.1 | 16.1 |
| Total | 100.0 | 100.0 |

*The block copolymer solution contains 20.5% of the fluorine block copolymer Modiper F600 ™, 8.5% of the silicon block copolymer Modiper FS700 ™, and 71.0% acryloylmorpholine.

The liquid vehicle has an acid value of 20.9 (Reference Example 9) and 21.0 (Reference Examples 10–12).

In producing the radiation-curable ink compositions, a pigment, dispersing agent, photopolymerization initiator, photosensitizer, surfacer, defoamer, wax and thermal polymerization inhibitor are also used, as described in Reference Examples 1–4, above. The components used in Reference Examples 9–12 are as follows:

| | Reference Example # | | | |
|---|---|---|---|---|
| | Ex. 9 | Ex. 10 | Ex. 11 | Ex. 12 |
| | | Color | | |
| Component | White | Yellow | Red | Blue |
| Liquid vehicle | 100.0 | 100.0 | 100.0 | 100.0 |
| titanium dioxide TIPAQUE CR-580 ™ | 45.5 | | | |
| NOVAPERM RED F3RK-70 ™ (Hoechst) | | | 6.6 | |
| HELIOGEN BLUE-L-7080 ™ | | | | 6.6 |
| IRGAZIN YELLOW 2GLTE ™ (Ciba Geigy) | | 6.6 | | |
| Disperbyk-110 ™ | 0.8 | | | |
| Disperbyk-160 ™ | | 1.2 | 1.2 | 1.2 |
| BYK-306 ™ | 0.8 | 0.6 | 0.6 | 0.6 |
| AQUALEN N ™ | 1.5 | 1.2 | 1.2 | 1.2 |
| fluorinated polyethylene wax | 3.0 | 2.3 | 2.3 | 2.3 |
| p-methoxyphenol | 0.05 | 0.05 | 0.05 | 0.05 |

Untreated polyethylene terephthalate sheets are screen printed and tested as in Working Examples 1–3 and 6. The sheets do not show signs of exfoliation at a peel-off test with a cellulose adhesive tape, but instead show close adhesion to the base. The cured films are then detached from the base. The films show no traces of prints or signs of erosion after dipping the cured films in a 5% aqueous solution of sodium hydroxide at 80° C. for 5 minutes.

REFERENCE EXAMPLES 13–16

Following the same procedures as in Reference Examples 1–4, four additional radiation-curable ink compositions are prepared. The liquid vehicles for the ink compositions have the following compositions:

| | Parts by weight | |
|---|---|---|
| Component | Ex. 13 | Ex. 14–16 |
| Preparation Example 1 B-1 | 26.4 | 27.7 |
| monoacryloyloxyethyl succinate | 8.1 | 7.9 |
| Preparation Example 2 (b) | 4.3 | 4.1 |
| fluorine block copolymer Modiper F600 ™ | 4.7 | 4.8 |
| trimethylol propane triepoxy acrylate | 11.5 | 11.0 |
| phenoxyethyl acrylate | 26.4 | 27.6 |
| acryloylmorpholine | 18.6 | 16.9 |
| Total | 100.0 | 100.0 |

The liquid vehicle has an acid value of 27.2 (Reference Example 13) and 26.4 (Reference Examples 14–16). In producing the radiation-curable ink compositions, a pigment, dispersing agent, photopolymerization initiator, photosensitizer, surfacer, defoamer, wax and thermal polymerization inhibitor are also used, as described in Reference Examples 1–4, above. The components used in Reference Examples 13–16 are as follows:

| | Reference Example # | | | |
|---|---|---|---|---|
| | Ex. 13 | Ex. 14 | Ex. 15 | Ex. 16 |
| | | Color | | |
| Component | White | Yellow | Red | Blue |
| Liquid vehicle | 100.0 | 100.0 | 100.0 | 100.0 |
| titanium dioxide TIPAQUE CR-580 ™ | 51.7 | | | |
| NOVAPERM RED F3RK-70 ™ (Hoechst) | | | 12.9 | |

-continued

| Component | Reference Example # | | | |
|---|---|---|---|---|
| | Ex. 13 | Ex. 14 | Ex. 15 | Ex. 16 |
| | Color | | | |
| | White | Yellow | Red | Blue |
| HELIOGEN BLUE-L-7080 ™ | | | | 12.9 |
| IRGAZIN YELLOW 2GLTE ™ (Ciba Geigy) | | 12.9 | | |
| Disperbyk-110 ™ | 0.9 | | | |
| Disperbyk-160 ™ | | 1.3 | 1.3 | 1.3 |
| acylphosphine oxide | 10.3 | | | |
| diethylthioxanthone | | 3.9 | 3.9 | 3.9 |
| isoamyl 4-dimethylamino-benzoate | | 3.9 | 3.9 | 3.9 |
| VERSA-FLOW BASE ™ | 2.6 | 1.9 | 1.9 | 1.9 |
| AQUALEN N ™ | 3.4 | 2.6 | 2.6 | 2.6 |
| fluorinated polyethylene wax | 3.4 | 2.6 | 2.6 | 2.6 |
| p-methoxyphenol | 0.05 | 0.05 | 0.05 | 0.05 |

Untreated polyethylene terephthalate sheets are screen printed and tested as in Working Examples 1–3 and 6. The sheets do not show signs of exfoliation at a peel-off test with a cellulose adhesive tape, but instead show close adhesion to the base. The cured films are then detached from the base. The films show no traces of prints or signs of erosion after dipping the cured films in a 5% aqueous solution of sodium hydroxide at 80° C. for 5 minutes.

What is claimed is:

1. A printed thermoplastic resin product which is (I) printed on a surface with a radiation-curable printing ink which comprises a vehicle mixture comprising:
   (A) at least one ingredient selected from the group consisting of a linear polyester oligomer substantially free of an acid group and free of a polymerizable double bond on the linear polyester chain, wherein 1 to 10 double bonds are pendent from the linear polyester chain; a linear polyester polymer substantially free of an acid group and free of a polymerizable double bond on the linear polyester polymer chain, wherein 1 to 10 double bonds are pendent from the linear polyester polymer chain; and mixtures thereof,
   (B) at least one ingredient having at least one acid group and being selected from the group consisting of a one double bond-containing carboxylic acid, a carboxylic ester of said acid, a carboxylic amide of said acid, and mixtures thereof,
   (C) a double bond-containing polycarboxylic ester wherein 2 to 10 acid groups are present and at least 2 double bonds are pendent from the carboxylic ester having 2 to 10 acid groups,
   (D) at least one ingredient selected from the group consisting of a double bond-containing fluorinated carboxylic ester, a block copolymer comprising a fluorinated alkyl group-containing polymer segment and a methacrylic or acrylic polymer segment, a block copolymer comprising a siloxane group-containing polymer segment and a methacrylic or acrylic polymer segment, and mixtures thereof, provided that when said ingredient (D) is said double bond-containing fluorinated carboxylic ester, said ingredient is contained in an amount of from 1 to 20 parts by weight per 100 parts by weight of said vehicle mixture,
   (E) a double bond-containing carboxylic ester, having at least 2 double bonds and free of an acid group, provided that it is excluded from the above-mentioned ingredient (A) and
   (F) at least one ingredient selected from the group consisting of a one double bond-containing carboxylic ester free of an acid group; a one double bond-containing carboxylic amide free of an acid group; a one double bond-containing carboxylic imide free of an acid group; and mixtures thereof,
   wherein the acid value of the vehicle mixture is from 5 to 100 and the double bonds of said components (A) to (F) are carbon-carbon double bonds, and (II) treated with radiation on the printed surface thereof to cure the printing ink.

2. The printed thermoplastic resin product according to claim 1, wherein the radiation-curable printing ink further comprises:
   (i) 0 to 20 parts by weight of a photopolymerization initiator,
   (ii) 0 to 20 parts by weight of a photosensitizer and
   (iii) 0 to 100 parts by weight of an organic and/or inorganic pigment,
   each per 100 parts by weight of the vehicle mixture.

3. The thermoplastic resin product according to claim 1, wherein the thermoplastic resin product is a polyethylene terephthalate product with a roughed surface.

4. The thermoplastic resin product according to claim 1, wherein the thermoplastic resin product is a container for cosmetics and toiletries, for liquid seasonings, for drinks, for medicine or for liquid detergents.

5. The thermoplastic resin product according to claim 1, wherein the double bond-containing fluorinated carboxylic ester of the ingredient (D) is a fluorinated alcoholic residue-containing ester or a fluorinated macro-monomer wherein a main chain of said fluorinated macro-monomer has a fluorinated group and a side chain of said fluorinated macro-monomer is a pendent acryloyl or methacryloyl group.

6. The thermoplastic resin product according to claim 1, wherein the fluorinated carboxylic ester of the ingredient (D) is at least one methacrylate or acrylate ester selected from the group consisting of trifluoroethyl methacrylate or acrylate, tetrafluoropropyl methacrylate or acrylate, octafluoropentyl methacrylate or acrylate, and heptadecafluorodecyl methacrylate or acrylate.

7. The thermoplastic resin product according to claim 1, wherein the block copolymer comprising a fluorinated alkyl group-containing polymer segment of the ingredient (D) is present in the range of 1 to 10 parts by weight per 100 parts of the vehicle mixture.

8. The thermoplastic resin product according to claim 1, wherein the block copolymer comprising a siloxane group-containing polymer segment of the ingredient (D) is present in the range of 0.05 to 10 parts by weight per 100 parts of the vehicle mixture.

9. The thermoplastic resin product according to claim 1, wherein the ingredient (D) is a mixture of two or three members selected from the group consisting of
   (1) a double bond-containing fluorinated carboxylic ester
   (2) a block copolymer which comprises a fluorinated alkyl group-containing polymer segment and a acrylic polymer segment, and
   (3) a block copolymer which comprises a siloxane group-containing polymer segment and a methacrylic or acrylic polymer segment.

10. The thermoplastic resin product according to claim 9, wherein the total amount of the mixture of the ingredient (D) is in the range of 1 to 10 parts by weight per 100 parts of the vehicle mixture.

11. The thermoplastic resin product according to claim 1, wherein the ingredient (A) is selected from oligomers or polymers which contain at least one vinyl, allyl, methacryloyl, acryloyl, or crotonyl group.

12. The thermoplastic resin product according to claim 1, wherein the ingredient (A) is at least one oligomer or polymer of classified urethane methacrylates or acrylates derived from a saturated polyester polyol compound, a polyisocyanate compound and a compound having a methacryloyl or acryloyl group and an active hydrogen group as starting compounds.

13. The thermoplastic resin product according to claim 12, wherein the saturated polyester polyol compound is synthesized from a dicarboxylic acid component and a glycol component wherein the dicarboxylic acid component is at least one compound selected from the group consisting of an aromatic dicarboxylic acid, an aliphatic dicarboxylic acid, an alicyclic dicarboxylic acid and a heterocyclic dicarboxylic acid and the glycol component is selected from the group consisting of an alkylene glycol, a dialkylene glycol, cyclohexanedimethanol, spiro glycol, 1,4-phenylene glycol, bisphenol A ethylene oxide, bisphenol A polyethylene oxide, and polyethylene glycol.

14. The thermoplastic resin product according to claim 12, wherein the polyisocyanate compound is at least one compound selected from the group consisting of 2,4-trilene diisocyanate, diphenylmethane diisocyanate, 1,3-diisocyanate methylcyclohexane, 1,4-diisocyanate methylcyclohexane, 4,4'-diisocyanate dicyclohexane, 4,4'-diisocyanate dicyclohexylmethane, and isophorone diisocyanate.

15. The thermoplastic resin product according to claim 12, wherein the compound having a methacryloyl or acryloyl group and an active hydrogen group is at least one compound selected from the group consisting of a dihydric alcohol monomethacrylate or monoacrylate, trihydric alcohol mono- or dimethacrylate or mono- or diacrylate, polyhydric alcohol methacrylate or acrylate having at least one hydroxy group, a hydroxy group-containing methacrylate or acrylate of a 4 or more hydroxy group-containing alcohol, a hydroxy group-containing compound derived from methacrylation or acrylation of a caprolactone derivative of any of the aforementioned alcohol compounds, and epoxy methacrylates or acrylates derived from a ring-opening addition of a methacrylic or acrylic acid with a glycidyl ether derivative of dihyyric or polyhydric alcohols or with phenolic hydroxy group-containing compounds.

16. The thermoplastic resin product according to claim 1, wherein the ingredient (B) is at least one monomer selected from the group consisting of monomers which contain (i) one vinyl group, allyl group, methacryloyl group, acryloyl group, or crotonyl group, and (ii) one carboxyl group, sulfonyl group, or phosphoryl group.

17. The thermoplastic resin product according to claim 1, wherein the ingredient (B) is synthesized by reacting a compound having a double bond and a hydroxyl group in the same molecule, with a cyclic acid anhydride corresponding to its hydroxyl equivalent.

18. The thermoplastic resin product according to claim 1, wherein the ingredient (B) is at least one compound selected from the group consisting of an alkylene oxide derivative of acid anhydride-carboxylated methacrylic or acrylic acid, a caprolactone derivative of acid anhydride-carboxylated methacrylic or acrylic acid, a monoglycidyl ether derivative of acid anhydride-carboxylated methacrylic or acrylic acid, an acid anhydride-carboxylated methylol methacrylic or acrylic amide, methacryloxyethylphosphate, acryloxyethylphosphate, methacryloxyethylphosphorylphenyl, acryloxyethylphosphorylphenyl, dimethacryloxyethylphosphate, diacryloxyethylphosphate, methacryloxyethylsulfonate, acryloxyethylsulfonate, dimethacryloxyethylsuccinylsulfonate, and diacryloxyethylsuccinylsulfonate.

19. The thermoplastic resin product according to claim 18, wherein ingredient (B) is formed from at least one compound selected from the group consisting of saturated or unsaturated aliphatic dicarboxylic anhydrides, alicyclic dicarboxylic anhydrides, aromatic dicarboxylic anhydrides and tricarboxylic anhydrides.

20. The thermoplastic resin product according to claim 18, wherein the ingredient (B) is formed from succinic anhydride, maleic anhydride, dodecylsuccinic anhydride, phthalic anhydride, tetrahydrophthalic anhydride or a mixture of at least two of these anhydrides.

21. The thermoplastic resin product according to claim 1, wherein the ingredient (C) is at least one oligomer having at least two vinyl groups, allyl groups, methacryloyl groups, acryloyl groups or crotonyl groups, and having 2 to 10 carboxyl groups, sulfonyl groups, or phosphoryl groups.

22. The thermoplastic resin product according to claim 1, wherein the ingredient (C) is synthesized by reacting an epoxy-acrylate or methacrylate with a cyclic acid anhydride, wherein the epoxy-acrylate or methacrylate is obtained by ring-opening esterification of a poly-epoxy compound and a methacrylic acid or acrylic acid.

23. The thermoplastic resin product according to claim 22, wherein the epoxy-acrylate or methacrylate is at least one compound selected from the group consisting of a methacrylic or acrylic acid derivative of neopentyl glycol diglycidyl ether, a methacrylic or acrylic acid derivative of 1,6-hexanediol diglycidyl ether, a methacrylic or acrylic acid derivative of trimethylol propane triglycidyl ether, a methacrylic or acrylic acid derivative of bisphenol A glycidyl ether, a methacrylic or acrylic acid derivative of epoxyphenolnovolak, and a methacrylic or acrylic acid derivative of phthalic acid diglycidyl ether.

24. The thermoplastic resin product according to claim 22, wherein the cyclic acid anhydride is succinic anhydride, maleic anhydride, dodecylsuccinic anhydride, phthalic anhydride, trimellitic anhydride, tetrahydrophthalic anhydride or a mixture of at least two of these anhydrides.

25. The thermoplastic resin product according to claim 1, wherein the ingredient (E) is at least one compound selected from the group consisting of dihydric alcohol dimethacrylates or diacrylates, trihydric alcohol trimethacrylates or triacrylates, polyhydric alcohol methacrylates or acrylates, epoxy methacrylates or acrylates, urethane methacrylates or acrylates, ester methacrylates or acrylates, polyether methacrylates or acrylates, polybutadiene urethane methacrylates or acrylates and polybutadiene methacrylates or acrylates.

26. The thermoplastic resin product according to claim 1, wherein the ingredient (F) is selected from the group consisting of 2-ethylhexyl methacrylate or acrylate, cyclohexyl methacrylate or acrylate, dicyclopentanyl methacrylate or acrylate, benzyl methacrylate or acrylate, phenoxyethyl methacrylate or acrylate, tolyloxyethyl methacrylate or acrylate, ethoxyethyl methacrylate or acrylate, ethylcarbitol methacrylate or acrylate, isobornyl methacrylate or acrylate, methoxypropylene glycol methacrylate or acrylate, methacryloylmorpholine, acryloylmorpholine, N-vinylpyrrolidone, N-vinylcaprolactam, N,N-diethylaminoethyl methacrylate or acrylate, t-butylaminoethyl methacrylate or acrylate, 2-hydroxyethyl methacrylate or acrylate, 2-hydroxypropyl methacrylate or acrylate, 3-butoxy-2-hydroxypropyl methacrylate or acrylate, caprolactone 2-hydroxyethyl methacrylate or acrylate, 3-phenoxy-2-hydroxypropyl methacrylate or acrylate, glycidyl methacrylate or acrylate, and ethylene oxide butoxylated phosphoric acid methacrylate or acrylate.

27. A method for printing a plastic product, which comprises (I) printing on a surface of a plastic product with a radiation-curable printing ink which comprises a vehicle mixture containing:
- (A) at least one ingredient selected from the group consisting of a linear polyester oligomer substantially free of an acid group and free of a polymerizable double bond on the linear polyester chain, wherein 1 to 10 double bonds are pendent from the linear polyester chain; a linear polyester polymer substantially free of an acid group and free of a polymerizable double bond on the linear polyester polymer chain, wherein 1 to 10 double bonds are pendent from the linear polyester polymer chain; and mixtures thereof,
- (B) at least one ingredient having at least one acid group and being selected from the group consisting of a one double bond-containing carboxylic acid, a carboxylic ester of said acid, a carboxylic amide of said acid, and mixtures thereof,
- (C) a double bond-containing polycarboxylic ester wherein 2 to 10 acid groups are present and at least 2 double bonds are pendent from the carboxylic ester having 2 to 10 acid groups,
- (D) at least one ingredient selected from the group consisting of a double bond-containing fluorinated carboxylic ester, a block copolymer comprising a fluorinated alkyl group-containing polymer segment and a methacrylic or acrylic polymer segment, a block copolymer comprising a siloxane group-containing polymer segment and a methacrylic or acrylic polymer segment, and mixtures thereof, provided that when said ingredient (D) is said double bond-containing fluorinated carboxylic ester, said ingredient is contained in an amount of from 1 to 20 parts by weight per 100 parts by weight of said vehicle mixture
- (E) a double bond-containing carboxylic ester, having at least 2 double bonds and free of an acid group, provided that it is excluded from the above-mentioned ingredient (A) and
- (F) at least one ingredient selected from the group consisting of a one double bond-containing carboxylic ester free of an acid group; a one double bond-containing carboxylic amide free of an acid group; a one double bond-containing carboxylic imide free of an acid group; and mixtures thereof, wherein the acid value of the vehicle mixture is from 5 to 100 and the double bonds of said components (A) to (F) are carbon-carbon double bonds, and (II) treating the printed surface thereof with radiation to cure the printing ink.

28. The method according to claim 27, wherein the radiation-curable printing ink further comprises:
- (i) 0 to 20 parts by weight of a photopolymerization initiator,
- (ii) 0 to 20 parts by weight of a photosensitizer and
- (iii) 0 to 100 parts by weight of an organic and/or inorganic pigment, each per 100 parts by weight of the vehicle mixture.

29. The method according to claim 28, wherein the plastic product is a polyethylene terephthalate product.

30. The method according to claim 29, wherein the ingredient (D) is the mixture of two or three members selected from the group consisting of (1) a double bond-containing fluorinated carboxylic ester,
(2) a block copolymer which comprises a fluorinated alkyl group-containing polymer segment and a acrylic polymer segment, and
(3) a block copolymer which comprises a siloxane group-containing polymer segment and a methacrylic or acrylic polymer segment.

31. The method according to claim 29, wherein a surface of the plastic product may be untreated, roughened or treated with flame, corona discharge or anchor coating before said printing.

32. The method according to claim 28, wherein the ingredient (D) is a fluorinated alcoholic residue-containing ester or a fluorinated macro-monomer wherein a main chain of said fluorinated macro-monomer has a fluorinated group and a side chain of said fluorinated macro-monomer is a pendent acryloyl or methacryloyl group.

33. The method according to claim 28, wherein the ingredient (D) is at least one methacrylate or acrylate ester selected from the group consisting of trifluoroethyl methacrylate or acrylate, tetrafluoropropyl methacrylate or acrylate, octafluoropentyl methacrylate or acrylate and heptadecafluorodecyl methacrylate or acrylate.

34. A printed thermoplastic resin product which is (I) printed on a surface with a radiation-curable printing ink composition which comprises a vehicle mixture comprising:
- (A) at least one ingredient selected from the group consisting of a linear polyester oligomer substantially free of an acid group and free of a polymerizable double bond on the linear polyester oligomer chain, wherein 1 to 10 double bonds are pendent from the linear polyester oligomer chain; a linear polyester polymer substantially free of an acid group and free of a polymerizable double bond on the linear polyester polymer chain, wherein 1 to 10 double bonds are pendent from the linear polyester polymer chain; and mixtures thereof,
- (B) at least one ingredient having at least one acid group and being selected from the group consisting of a one double bond-containing carboxylic acid, a carboxylic ester of said acid, a carboxylic amide of said acid, and mixtures thereof,
- (C) a double bond-containing polycarboxylic ester wherein 2 to 10 acid groups are present and at least 2 double bonds are pendent from the carboxylic ester having 2 to 10 acid groups, and
- (D) at least one ingredient selected from the group consisting of a double bond-containing fluorinated carboxylic ester, a block copolymer comprising a fluorinated alkyl group-containing polymer segment and a methacrylic or acrylic polymer segment, a block copolymer comprising a siloxane group-containing polymer segment and a methacrylic or acrylic polymer segment, and mixtures thereof, provided that when said ingredient (D) is said double bond-containing fluorinated carboxylic ester, said ingredient is contained in an amount of from 1 to 20 parts by weight per 100 parts by weight of said vehicle mixture, wherein the acid value of the vehicle mixture is from 5 to 100 and the double bonds of said components (A) to (D) are carbon-carbon double bonds, and (II) treated with radiation on the printed surface thereof to cure the printing ink.

35. The printed thermoplastic resin product according to claim 34, wherein the radiation-curable printing ink composition further comprises:

(i) 0 to 20 parts by weight of a photopolymerization initiator, (ii) 0 to 20 parts by weight of a photosensitizer, and (iii) 0 to 100 parts by weight of an organic and/or inorganic pigment, each per 100 parts by weight of the said vehicle mixture.

36. The printed thermoplastic resin product according to claim 34, wherein the radiation-curable printing ink composition further comprises:

(i) 0 to 20 parts by weight of a photopolymerization initiator, (ii) 0 to 20 parts by weight of a photosensitizer, and (iii) 0 to 60 parts by weight of an organic and/or inorganic pigment, each per 100 parts by weight of the said vehicle mixture.

* * * * *